(12) United States Patent
Jones et al.

(10) Patent No.: US 11,275,645 B2
(45) Date of Patent: *Mar. 15, 2022

(54) SYSTEM AND METHOD FOR THE DYNAMIC ANALYSIS OF EVENT DATA

(71) Applicants: Richard B. Jones, Houston, TX (US);
Dwayne L. Mason, Houston, TX (US)

(72) Inventors: Richard B. Jones, Houston, TX (US);
Dwayne L. Mason, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/724,919

(22) Filed: Apr. 2, 2020

(65) Prior Publication Data

US 2020/0233740 A1 Jul. 23, 2020

Related U.S. Application Data

(63) Continuation of application No. 14/784,868, filed as application No. PCT/US2014/029488 on Mar. 14, 2014, now Pat. No. 10,514,977.

(Continued)

(51) Int. Cl.
G06F 11/07 (2006.01)
G07C 3/08 (2006.01)
G06K 9/62 (2022.01)

(52) U.S. Cl.
CPC ........ *G06F 11/0793* (2013.01); *G06F 11/079* (2013.01); *G06F 11/0721* (2013.01); *G06K 9/6265* (2013.01); *G07C 3/08* (2013.01)

(58) Field of Classification Search
CPC . G06F 11/079; G06F 11/0793; G06F 11/0721
See application file for complete search history.

(56) References Cited

U.S. PATENT DOCUMENTS 6,012,152 A 1/2000 Douik et al.
6,925,364 B1 8/2005 Huberman et al.
(Continued)

FOREIGN PATENT DOCUMENTS

WO 2014/144893 9/2014

OTHER PUBLICATIONS

United States Patent and Trademark Office; PCT International Search Report, issued in connection to PCT/US14/29488; dated Aug. 22, 2014; 2 pages; US.
(Continued)

*Primary Examiner* — Nadeem Iqbal
(74) *Attorney, Agent, or Firm* — Greenberg Traurig, LLP

(57) ABSTRACT

Disclosed is a system and method for the analysis of event data that enables analysts to create user specified datasets in a dynamic fashion. Performance, equipment and system safety, reliability, and significant event analysis utilizes failure or performance data that are composed in part of time-based records. These data identify the temporal occurrence of performance changes that may necessitate scheduled or unscheduled intervention like maintenance events, trades, purchases, or other actions to take advantage of, mitigate or compensate for the observed changes. The criteria used to prompt a failure or performance record can range from complete loss of function to subtle changes in performance parameters that are known to be precursors of more severe events. These specific criteria applied to any explicit specific application and this invention is relevant to this type of data taxonomy and can be applied across all areas in which event data may be collected.

14 Claims, 24 Drawing Sheets

Related U.S. Application Data

(60) Provisional application No. 61/794,403, filed on Mar. 15, 2013.

(56) References Cited

U.S. PATENT DOCUMENTS

| | | | |
|---|---|---|---|
| 7,890,473 B1* | 2/2011 | Wyett | G06F 11/3409 |
| | | | 707/688 |
| 8,694,196 B1* | 4/2014 | Doulatshahi | G06Q 10/20 |
| | | | 701/29.1 |
| 10,514,977 B2 | 12/2019 | Jones | |
| 2003/0023715 A1 | 1/2003 | Reiner et al. | |
| 2006/0235649 A1* | 10/2006 | Lancaster | G06F 11/008 |
| | | | 702/182 |
| 2009/0018996 A1 | 1/2009 | Hunt et al. | |
| 2013/0040636 A1* | 2/2013 | Borg | G06Q 10/0631 |
| | | | 455/425 |
| 2013/0041710 A1* | 2/2013 | Civil | G06F 17/18 |
| | | | 705/7.27 |
| 2014/0006862 A1 | 1/2014 | Jain et al. | |
| 2016/0062820 A1 | 3/2016 | Jones et al. | |
| 2017/0300372 A1 | 10/2017 | Andreopoulos | |

OTHER PUBLICATIONS

United States Patent and Trademark Office; PCT Written Opinion of the International Searching Authority, issued in connection to PCT/US14/29488; dated Aug. 22, 2014; 4 pages; US.

The International Bureau of WIPO; PCT International Preliminary Report on Patentability, issued in connection to PCT/US14/29488; dated Sep. 15, 2015; 5 pages; Switzerland.

* cited by examiner

Fig. 2

|  |  |  |
|---|---|---|
| 7/25/2001 | Big Bertha (Oil Quality) | 41.98 |
| 1/31/2009 | Big Bertha (Oil Quality) | 96.56 |
| 1/11/2008 | Compressor #2 | 0.00 |
| 10/23/2007 | Primary Feedwater Pump #1 | 36.27 |
| 9/27/2000 | Primary Feedwater Pump #1 | 50.88 |
| 11/27/2007 | Primary Feedwater Pump #1 | 27.49 |
| 6/17/2001 | Secondary Feedwater Pump #1 | 24.30 |
| 4/13/2007 | Secondary Feedwater Pump #1 | 77.57 |
| 5/3/2010 | Secondary Feedwater Pump #1 | 19.28 |
| 7/7/2003 | Secondary Feedwater Pump #1 | 49.09 |
| 10/7/2005 | Secondary Feedwater Pump #1 | 77.79 |
| 6/30/2004 | Secondary Feedwater Pump #1 | 40.20 |
| 8/7/2002 | Secondary Feedwater Pump #1 | 42.65 |
| 4/15/2012 | Steam Turbine 1 | 88.60 |
| 8/6/2008 | Steam Turbine 1 | 15.00 |
| 1/1/2000 | Steam Turbine 2 | 51.55 |
| 11/25/2003 | Steam Turbine 2 | 48.61 |
| 10/20/2006 | Steam Turbine 2 | 22.23 |
| 9/12/2007 | Steam Turbine 2 | 6.24 |
| 1/5/2005 | Steam Turbine 3 | 88.37 |
| 3/12/2009 | Steam Turbine 3 | 94.97 |
| 1/18/2005 | Steam Turbine 3 | 57.80 |
| 4/29/2008 | Switchgear A | 111.75 |
| 9/12/2002 | Switchgear A | 98.68 |
| 10/16/2003 | Switchgear A | 132.81 |
| 5/3/2003 | Switchgear A | 65.53 |
| 4/7/2002 | Switchgear B | 10.25 |

Fig. 3

| | | |
|---|---|---|
| Big Bertha (Oil Quality) | 90 | 120 |
| Compressor #2 | 0.005 | 0.01 |
| Primary Feedwater Pump #1 | 10 | 12 |
| Secondary Feedwater Pump #1 | 15 | 20 |
| Steam Turbine 1 | 75 | 98 |
| Steam Turbine 2 | 75 | 98 |
| Steam Turbine 3 | 75 | 98 |
| Switchgear A | 50 | 100 |
| Switchgear B | 50 | 100 |

Fig. 4

Main Screen:Condition Data

Time Interval Specification
Trend Analysis
Graphics

F1=Continue     ↕=Change Group     ESC=Prev     CTRL-E=Exit

Fig. 5

```
Condition Monitoring Trend Analysis
     Time Interval Specification
              Month   Day   Year
Start Date      1      1    2007

Stop Date       1      1    2012
```

Fig. 6A

```
            Condition Monitoring Data Compilation
                       Group Definitions
Start Date: 1 - 1 - 2007              End Date: 1 - 1 - 2012
              Group           Component ID
               ___     Big Bertha (Oil Quality)
               ___     Compressor #2
               ___     Primary Feedwater Pump #1
               ___     Secondary Feedwater Pump #1
               ___     Steam Turbine 1
               ___     Steam Turbine 2
               ___     Steam Turbine 3
               ___     Switchgear A
               ___     Switchgear B
F1=Continue    F2=Group All    F3=Group Each    F4=Clr Groups    F5=Prt Scrn
   ALT-M=ID Description    ↕=Change Group    ESC=Prev    CTRL-E=Exit
```

Fig. 6B

Condition Monitoring Data Compilation
Group Definitions
Start Date: 1 - 1 - 2007          End Date: 1 - 1 - 2012

| Group | Component ID |
|---|---|
| — | Big Bertha (Oil Quality) |
| — | Compressor #2 |
| 2 | Primary Feedwater Pump #1 |
| 2 | Secondary Feedwater Pump #1 |
| 1 | Steam Turbine 1 |
| 1 | Steam Turbine 2 |
| 1 | Steam Turbine 3 |
| 3 | Switchgear A |
| 3 | Switchgear B |

F1=Continue   F2=Group All   F3=Group Each   F4=Clr Groups   F5=Prt Scrn
ALT-M=ID Description   ↕=Change Group   ESC=Prev   CTRL-E=Exit

Fig. 6C

Condition Monitoring Data Compilation
Group Definitions
Start Date: 1 - 1 - 2007          End Date: 1 - 1 - 2012

| Group | Component ID |
|---|---|
| 1 | Big Bertha (Oil Quality) |
| 2 | Compressor #2 |
| 3 | Primary Feedwater Pump #1 |
| 4 | Secondary Feedwater Pump #1 |
| 5 | Steam Turbine 1 |
| 6 | Steam Turbine 2 |
| 7 | Steam Turbine 3 |
| 8 | Switchgear A |
| 9 | Switchgear B |

F1=Continue   F2=Group All   F3=Group Each   F4=Clr Groups   F5=Prt Scrn
ALT-M=ID Description   ↕=Change Group   ESC=Prev   CTRL-E=Exit Trend Plot – Data Only Trend Plot with polynomials

Fig. 9

```
          TREND      ANALYSIS      DETAIL 1
                  Details for Group 1
          Start Time: Jan 1 2007          Stop Time: Jan 1 2012
Trend Analysys Results:  100%   probability of an INCREASING TREND
                          0%    probability of NO TREND Proportion of Data Behavior
          Regression Equation       Explained by Regression Equation
              Linear                          38.9%
              Quadratic                       50.4%
              Cubic                           55.5%

Date Predictions
          Probability Distribution     Alert          Action
              Linear                 9-Jan-2012      26-Aug-2016
              Quadratic              11-Aug-2011     8-Jan-2013
              Cubic                  8-Aug-2011      17-May-2012

F2=Detail-2    ↕=Change Group    F5=Prt Scrn    ESC=Prev    CTRL-E=Exit
   ALT-G=Group IDs         ALT-M=ID Description    ALT-A=Enter Threshold Reading
```

Fig. 10

```
          TREND      ANALYSIS      DETAIL 1
                  Details for Group 1
          Start Time: Jan 1 2007          Stop Time: Jan 1 2012
Trend Analysys Results:  100%   probability of an INCREASING TREND
                          0%    probability of NO TREND Proportion of Data Behavior
          Regression Equation       Explained by Regression Equation
              Linear                          38.9%
              Quadratic                       50.4%
              Cubic                           55.5%

Date Prediction for
          Probability Distribution         Reading: 9.123
              Linear                       12-Feb-2012
              Quadratic                    24-Aug-2011
              Cubic                        16-Aug-2011

PRESS   ANY   KEY   TO   CONTINUE
```

Fig. 13

| Date | Event |
|---|---|
| 2/11/2004 | Gas Turbine 2 - Overspeed |
| 3/4/2012 | Compressor A Bearings |
| 2/2/2011 | Compressor B Bearings |
| 4/17/2003 | Compressor B Bearings |
| 5/5/2008 | Compressor A Bearings |
| 4/2/2005 | Compressor B Bearings |
| 11/25/2004 | Gas Turbine 3 - Lube Oil |
| 9/12/2004 | Motor 2345 |
| 2/14/2007 | Compressor B Bearings |
| 10/20/2008 | Gas Turbine 3 - Lube Oil |
| 3/10/2006 | ECC Values (FTO) |
| 2/8/2004 | Gas Turbine 1 - Overspeed |
| 1/13/2009 | Motor 1234 |
| 8/7/2007 | Gas Turbine 2 - Lube Oil |
| 1/11/2006 | Gas Turbine 2 - Overspeed |
| 7/21/2008 | Compressor B Bearings |
| 4/22/2008 | Motor 345 |
| 6/21/2008 | Pump A-Seal Leak |
| 9/23/2009 | Compressor C Bearings |
| 9/13/2007 | Gas Turbine 1 - Overspeed |
| 2/6/2010 | Motor 1234 |
| 7/24/2009 | Gas Turbine 2 - Lube Oil |
| 4/21/2012 | Gas Turbine 3 - Lube Oil |
| 8/15/2009 | ECC Values (FTC) |
| 7/5/2012 | Gas Turbine 1 - Overspeed |
| 8/16/2011 | ECC Values (FTC) |
| 7/13/2003 | ECC Values (FTO) |
| 2/4/2003 | Pump C-Seal Leak |
| 7/31/2010 | Gas Turbine 1 - Lube Oil |
| 3/24/2008 | ECC Values (FTC) |
| 4/7/2003 | ECC Values (FTC) |
| 9/19/2009 | Gas Turbine 2 - Lube Oil |
| 1/29/2008 | ECC Values (FTC) |
| 9/28/2011 | Gas Turbine 1 - Lube Oil |
| 4/30/2010 | Motor 345 |
| 11/18/2011 | ECC Values (FTC) |
| 6/6/2007 | Pump B-Seal Leak |
| 12/14/2003 | Pump B-Seal Leak |
| 7/1/2010 | Gas Turbine 1 - Lube Oil |
| 9/18/2004 | Gas Turbine 1 - Lube Oil |

Fig. 16A

Failure Data Compilation
Group Definitions

Start Date: 1 - 1 - 2004                End Date: 8 - 23 - 2012

| Group | Component ID | Group | Component ID |
|---|---|---|---|
| __ | ECC Values (FTC) | __ | Gas Turbine 1 - Lube Oil |
| __ | ECC Values (FTO) | __ | Gas Turbine 2 - Lube Oil |
| __ | Pump A-Seal Leak | __ | Gas Turbine 3 - Lube Oil |
| __ | Pump B-Seal Leak | | |
| __ | Pump C-Seal Leak | | |
| __ | Compressor A Bearings | | |
| __ | Compressor B Bearings | | |
| __ | Compressor C Bearings | | |
| __ | Motor 1234 | | |
| __ | Motor 2345 | | |
| __ | Motor 345 | | |
| __ | Gas Turbine 1 - Overspeed | | |
| __ | Gas Turbine 2 - Overspeed | | |
| __ | Gas Turbine 3 - Overspeed | | |

F1=Continue    F2=Group All    F3=Group Each    F4=Clr Groups    F5=Prt Scrn
    ALT-M=ID Description    ↕=Change Group    ESC=Prev    CTRL-E=Exit

Fig. 16B

Failure Data Compilation
Group Definitions

Start Date: 1 - 1 - 2004          End Date: 8 - 23 - 2012

| Group | Component ID | Group | Component ID |
|---|---|---|---|
| 1 | ECC Values (FTC) | 1 | Gas Turbine 1 - Lube Oil |
| 1 | ECC Values (FTO) | 1 | Gas Turbine 2 - Lube Oil |
| 1 | Pump A-Seal Leak | 1 | Gas Turbine 3 - Lube Oil |
| 1 | Pump B-Seal Leak | | |
| 1 | Pump C-Seal Leak | | |
| 1 | Compressor A Bearings | | |
| 1 | Compressor B Bearings | | |
| 1 | Compressor C Bearings | | |
| 1 | Motor 1234 | | |
| 1 | Motor 2345 | | |
| 1 | Motor 345 | | |
| 1 | Gas Turbine 1 - Overspeed | | |
| 1 | Gas Turbine 2 - Overspeed | | |
| 1 | Gas Turbine 3 - Overspeed | | |

F1=Continue   F2=Group All   F3=Group Each   F4=Clr Groups   F5=Prt Scm
ALT-M=ID Description   ↕=Change Group   ESC=Prev   CTRL-E=Exit

Fig. 16C

Failure Data Compilation
Group Definitions

Start Date: 1 - 1 - 2004     End Date: 8 - 23 - 2012

| Group | Component ID | Group | Component ID |
|---|---|---|---|
| 1 | ECC Values (FTC) | 15 | Gas Turbine 1 - Lube Oil |
| 2 | ECC Values (FTO) | 16 | Gas Turbine 2 - Lube Oil |
| 3 | Pump A-Seal Leak | 17 | Gas Turbine 3 - Lube Oil |
| 4 | Pump B-Seal Leak | | |
| 5 | Pump C-Seal Leak | | |
| 6 | Compressor A Bearings | | |
| 7 | Compressor B Bearings | | |
| 8 | Compressor C Bearings | | |
| 9 | Motor 1234 | | |
| 10 | Motor 2345 | | |
| 11 | Motor 345 | | |
| 12 | Gas Turbine 1 - Overspeed | | |
| 13 | Gas Turbine 2 - Overspeed | | |
| 14 | Gas Turbine 3 - Overspeed | | |

F1=Continue   F2=Group All   F3=Group Each   F4=Clr Groups   F5=Prt Scrn
ALT-M=ID Description   ↕=Change Group   ESC=Prev   CTRL-E=Exit

Fig. 17

| | Failure Data Compilation | | |
|---|---|---|---|
| | Group Definitions | | |
| Start Date: 1 - 1 - 2004 | | End Date: 8 - 23 - 2012 | |
| Group | Component ID | Group | Component ID |
| 1 | ECC Values (FTC) | 5 | Gas Turbine 1 - Lube Oil |
| 1 | ECC Values (FTO) | 5 | Gas Turbine 2 - Lube Oil |
| 2 | Pump A-Seal Leak | 5 | Gas Turbine 3 - Lube Oil |
| 2 | Pump B-Seal Leak | | |
| 2 | Pump C-Seal Leak | | |
| 3 | Compressor A Bearings | | |
| 3 | Compressor B Bearings | | |
| 3 | Compressor C Bearings | | |
| 4 | Motor 1234 | | |
| 4 | Motor 2345 | | |
| 4 | Motor 345 | | |
| 5 | Gas Turbine 1 - Overspeed | | |
| 5 | Gas Turbine 2 - Overspeed | | |
| 5 | Gas Turbine 3 - Overspeed | | |

F1=Continue　　F2=Group All　　F3=Group Each　　F4=Clr Groups　　F5=Prt Scrn
　ALT-M=ID Description　　↕=Change Group　　ESC=Prev　　CTRL-E=Exit Group 5 Data

TREND ANALYSIS
System Summary

| Select Detail | Group | Trend Type | Probability (Laplace/Mil-HBK) | MTBF (days) | PTNF (days) |
|---|---|---|---|---|---|
| [x] | 1 | IMP | 84 / 59 | 324 | 537 |
| [x] | 2 | IMP | 99 / 99 | 27 | 522 |
| [x] | 3 | DET | 99 / 99 | 245 | 156 |
| [x] | 4 | DET | 61 / 66 | 205 | 212 |
| [x] | 5 | IMP | 59 / 71 | 162 | 195 |

F1=Continue  F2=Select ALL  ↕=Change Group  F5=Prt Scrn  ESC=Prev  CTRL-E=Exit
ALT-G=Group IDs  ALT-M=ID Description

Fig. 24

| | | | |
|---|---|---|---|
| | Failure Data Compilation | | |
| | Group Summary of Testing and Repair Times | | |
| Start Date: 1 - 1 - 2004 | | End Date: 8 - 23 - 2012 | |
| Group | Number of Failures | Testing Time (days) | Repair Time (days) |
| 1 | 7 | 0.1 | 2.40 |
| 2 | 5 | 0.5 | 7.93 |
| 3 | 5 | 2.23 | 6.33 |
| 4 | 14 | 1.07 | 1.87 |
| 5 | 19 | 0.35 | 8.74 |

F1=Continue   F5=Prt Scrn   ↕=Change Group   ↔=Change Column   ESC=Prev   CTRL-E=Exit
ALT-G=Group IDs         ALT-M=ID Description

Fig. 25

PREVENTIVE MAINTENANCE

Enter Relative Cost Factors:

| | | |
|---|---|---|
| Testing | = | 0.1000 |
| Repair | = | 0.4700 |
| Failure | = | 0.3300 |
| Fixed | = | 0.1000 |
| Total | = | 1.0000 |

F1=Continue   F5=Prt Scrn   ↕=Change Lines   ESC=Prev   CTRL-E=Exit

Fig. 26

| | | PREVENTIVE MAINTENANCE - summary | | |
|---|---|---|---|---|
| Testing = 0.100 | Repair = 0.470 | Failure = 0.33 | Fixed = 0.100 | |
| Select Detail | Group | Min Unavailablity Interval (days) | Min Cost Interval (days) | Min Risk Interval (days) |
| [_] | 1 | 6 , 9 | 4 , 6 | 6 , 9 |
| [_] | 2 | 6 , 12 | 4 , 9 | 6 , 12 |
| [_] | 3 | 13 , 57 | 6 , 47 | 12 , 52 |
| [_] | 4 | 20 , 27 | 12 , 16 | 18 , 27 |
| [_] | 5 | 12 , 13 | 6 , 8 | 11 , 12 |

F1=Continue   F2=Select All   F5=Prt Scrn   ↕=Change Group   ESC=Prev   CTRL-E=E
ALT-G=Group IDs         ALT-M=ID Description

Fig. 27

PREVENTIVE MAINTENANCE - detail

| Group Number | = | 5 | | |
|---|---|---|---|---|
| | | | | Relative Cost Factors |
| Number of Failures | = | 19 | | Testing = 0.100 |
| MTBF | = | 163 | days | Repair = 0.470 |
| Average Testing | = | 0.350 | days | Failure = 0.330 |
| Average Repair | = | 8.740 | days | Fixed = 0.100 |

| Distribution | Min Unavailabilty Test Interval (days) | Min Cost Test Interval (days) | Min RiskTest Interval (days) |
|---|---|---|---|
| Exponential | 12 | 6 | 11 |
| Weibull | 13 | 8 | 13 |
| Gamma | 13 | 7 | 13 |
| Lognormal | 13 | 7 | 12 |

F1=Continue   F5=Prt Scrn   ↕=Change Group   ESC=Prev   CTRL-E=Exit
ALT-G=Group IDs         ALT-M=ID Description

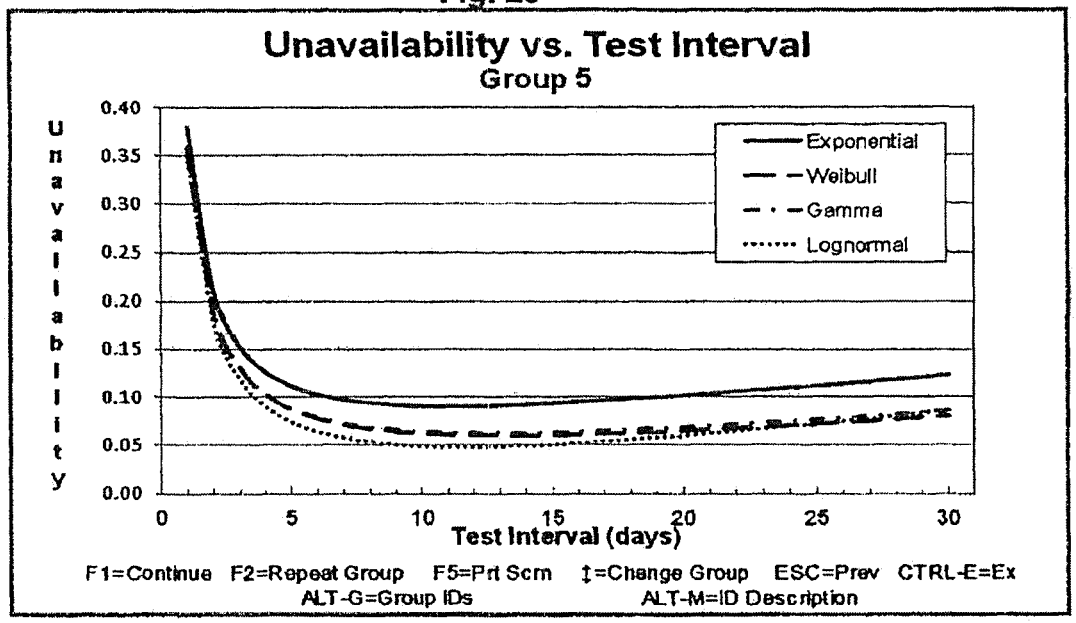

Fig. 30

| MAINTENANCE DECISION SUPPORT |
|---|

Risk Scenario Comparisons

| Scenario One | Scenario Two |
|---|---|
| Enter Relative Cost Factors: | Enter Relative Cost Factors: |
| Testing = 0.1000 | Testing = 0.3000 |
| Repair = 0.4700 | Repair = 0.4000 |
| Failure = 0.3300 | Failure = 0.2000 |
| Fixed = 0.1000 | Fixed = 0.1000 |

F1=Continue    F5=Prt Scrn         ESC=Prev    CTRL-E=Exit
         ↕=Change Group           ↔=Change Column

Fig. 31

MAINTENANCE DECISION SUPPORT
Group 5

| Scenario One | Scenario Two |
|---|---|
| Enter Relative Cost Factors: | Enter Relative Cost Factors: |
| Testing = 0.1000 | Testing = 0.3000 |
| Repair = 0.4700 | Repair = 0.4000 |
| Failure = 0.3300 | Failure = 0.2000 |
| Fixed = 0.1000 | Fixed = 0.1000 |

| Min Risk Test Interval (days) | Risk Function | Min Risk Test Interval (days) | Risk Function |
|---|---|---|---|
| 10 | 0.0115 | 12 | 0.0116 |
| 69 | 0.1757 | 82 | 0.1242 |
| 12 | 0.0073 | 14 | 0.0074 |
| 135 | 0.3111 | 169 | 0.2258 |

Probability Distribution            Risk Function One / Risk Function Two
Exponential                                         1.146
Weibull                                             1.188         For
Gamma                                               1.128       30 days
Lognormal                                           1.192

F1=Continue  F2=Repeat Group  F5=Prt Scrn  ↕=Change Group  ESC=Prev  CTRL-E=Exit
          ALT-G=Group IDs              ALT-M=ID Description

SYSTEM AND METHOD FOR THE DYNAMIC ANALYSIS OF EVENT DATA

CROSS-REFERENCE TO RELATED APPLICATIONS

This application is a continuation of U.S. Non-Provisional application Ser. No. 14/784,868 filed on Oct. 15, 2015, which is a U.S. national stage entry of PCT International Application No. PCT/US14/29488 filed Mar. 14, 2014 which claims the benefit of U.S. Provisional Application Ser. No. 61/794,403, filed Mar. 15, 2013, which is incorporated by reference in its entirety.

STATEMENTS REGARDING FEDERALLY SPONSORED RESEARCH OR DEVELOPMENT

Not applicable.

REFERENCE TO A MICROFICHE APPENDIX

Not applicable.

FIELD

The present disclosure relates to the analysis of event data, e.g., safety, reliability, and performance data, which enables analysts to create user specified datasets in a dynamic fashion. Datasets may be analyzed by statistical analysis tools to identify trends in event data, patterns in the time between events that can provide insights regarding event causality, prediction estimates or to compute optimal inspection intervals.

BACKGROUND AND BRIEF SUMMARY

Disclosed is a system and method for the analysis of event data that enables analysts to create user specified datasets in a dynamic fashion. Performance, equipment and system safety, reliability, and significant event analysis utilizes failure or performance data that are composed in part of time-based records. These data identify the temporal occurrence of performance changes that may necessitate unscheduled intervention like maintenance events, or other actions to mitigate or compensate for the observed changes. The criteria used to prompt a failure or performance record can range from complete loss of function to subtle changes in performance parameters that are known to be precursors of more severe events. These specific criteria applied to any explicit specific application and this invention is relevant to this type of data taxonomy.

The concept of failure or performance is not universally defined. In the case of machinery by way of example only, it depends on the equipment or system itself, its mission or role, the applied monitoring technology, and the risk appetite of the system owner. Subsequently, reliability data or failure or performance data is more accurately labeled as "event" data that can relate to safety incidents, insurance, situations requiring maintenance or operational changes, the occurrence of precursor conditions from condition monitoring, external effects, security (stock bond, mutual fund, etc.) fluctuations and other significant events that influence operations or other decisions. Reliability data is defined as temporal based information collected at a sub-component, component, sub-system, system and other possible categorical levels that documents performance levels achieving pre-defined values or ranges. The methods, systems and related data analyzed according to the present invention can relate to, e.g., facilities such as processing or manufacturing plants, industries (e.g., medical, airline, social media, telecommunications, oil and gas, chemicals, hydrocarbon processing, pharmaceutical, biotechnology) securities markets, weather, housing and commercial real estate markets, and any other application where data may be collected for analysis of failure or performance.

Systems and methods disclosed herein may also be applied to non-physical or generalized systems where the concept of maintenance, intervention, control or analogous concepts may or may not apply. Examples of such non-physical systems are stock value fluctuations, economic indicators, and the occurrence of weather events. This type of data is called significant event data and defined as temporal-based data records reflecting either changes in or the achievement of specific pre-set values.

In addition to event identification, another fundamental aspect of reliability refers to the description detail used to record the event characteristics. A classification structure or taxonomy is an extremely valuable aspect of reliability measurement in that it records the reason or reasons why the failure or performance occurred. Standard failure or performance classification systems exist but their use is dependent on regulatory and commercial management directions. Maintaining accurate failure or performance data requires discipline that it can have considerable benefits. The term failure or performance data as used herein not only means data associated with the failure or performance and/or reliability of equipment and machinery, but one skilled in the art will also understand that failure or performance data means data associated with any measure or classification that fails to meet performance, reliability thresholds or other criteria of interest. In other words, when data "fails to meet" it can be because it was lower or higher than a threshold. Moreover, robust failure or performance descriptions detailing the system, subsystems, equipment, financial instrument, insurance product, purchasing criteria, safety criteria, internet search criteria, security criteria, component, and failure or performance and/or reliability mode, for example, can help analysts identify systemic failure or performances and create data-driven programs such as reliability improvement. However, failure or performance and significant event taxonomies and their use vary by company and sometimes by location inside the same company.

In addition to data taxonomy considerations and the temporal recording of reliability and significant events, another data attribute using these characteristics is the value of data elements at time of data recordation. This type of data is referred to as condition monitoring that, for example could be vibration or pressure readings of a pump recorded at specified time, wheel brake pad thicknesses recorded during inspections, reactor vessel thicknesses recorded during unit overhauls, daily stock values, and any other value of interest. The recording times may or may not be at fixed intervals.

The most accurate analysis of equipment and system reliability requires data and expert insights on how to identify systematic patterns in failure or performance data. It is the identification and subsequent analysis of these relatively minor failure or performances that can prevent the large catastrophic events, e.g., resulting in loss, injury, and/or devaluation in equipment, money, value, personnel, systems or other interests. This statement is supported by the root cause analysis of large failure or performance events. The post accident analysis shoes that many accidents are the end results of a sequence of less severe, often seemingly innocuous events that together in tandem enabled or allowed the large failure or performance to occur. This is also seen in the technical analysis of stocks or other financial instruments when key support levels are violated or when companies announce hiring freezes or layoffs causing a ripple effect. It is a common conclusion in these reports that the major failure or performance would not have occurred if any one of the precursor events had been prevented or otherwise had not occurred or occurred at the levels that caused or otherwise resulted in the effect. It will be understood by one skilled in the art that the opposite is also true, e.g., when stocks reach new highs then support levels tend to increase.

In this context, analysis of failure or performance/event data, in any taxonomy, represents only a subset of the possible ways failure or performances can be identified. Given any failure or performance classification method and operational system, the failure or performance analysts need a dynamic system and method to look at reliability data from as many perspectives as possible to scan for possible systematic failure or performance sequences that, if continued or allowed to continue, may eventually precipitate a large failure or performance event or an event that suggests or otherwise requires a decision to be made, the latter which will at least be understood in relation to economic or financial performance related data.

Analysts need tools that enable them to look at failure or performance event relationships and reliability changes by the failure or performance mode, component, equipment, subsystem, system and other perspectives in a dynamic fashion. Analysis from these perspectives, based on the given process, equipment, and failure or performance classifications represents a best practice in reliability analysis and measurement.

Analysts tools for using historical events to identify patterns in failure or performance and significant event data relies on a combination of deterministic methods, and statistical tools, and reliability models. For example, the simple plots of the time between failure or performances (or events) as a function of failure or performance number can visually show analysts unique insights showing systematic patterns in failure or performances events identifying failure or performance mechanisms not anticipated by the classification taxonomy. For example, if this plot shows a sinusoidal-like pattern in failure or performance data, further analysis may indicate that the failure or performances mainly occurred within one hour of shift changes. The fix may be either the adoption of new shift transfer procedures, additional staff training on transfer responsibilities, or both. The time between failure or performance plot is the insight mechanism that elucidates the operational/organization inefficiencies and the continued analysis using this plot can show if this resolution measures taken were effective.

Another set of tools that are effective in systemic failure or performance identification are in the field of statistical trend analysis. These tools use the time between failure or performance data and the analysis interval to compute the statistically derived probability that the time between failure or performances (or events) is getting smaller (deterioration trend) or larger (improvement trend.) Both types of trends are easily identified given large data sets, but both types of trend can also be statistically identified with a smaller number of failure or performances. For example consider a situation where there are 5 failure or performances in the early part of the analysis interval and no failure or performances for the remainder of the time. This situation is emblematic of a case where the problem was identified early and fixed—no additional failure or performances. Statistical trend analysis could recognize the lack of failure or performances over the relatively long remainder of the analysis period and compute a high probability of an improvement trend. Conversely, if the same sequence of 5 failure or performances occurred at the end of the analysis period a deterioration trend might be shown. The timing of the failure or performances, not just between successive events but also the position of these failure or performances within the analysis period, is valuable information component to identify event trends.

The trend analysis of failure or performances addressed by this invention is a valuable tool to assess the validity of the data sets within the user-defined time interval and within the user-defined groups to be applied to standard reliability methods such as Weibull Analysis. The primary assumptions that often applied to industrial data are that the failure or performance or event data are "independent" and "identically distributed." These assumptions are represented in the reliability literature as: IID, however similar assumptions can be made for non-industrial data, e.g., financial and other similar data for which trend analysis of failure or performance criteria may be desired.

Data are independent if there is no association between the data values. In practice however, this assumption can be false. For example, consider this case study: A pump initially failed due to excessive leaking of a seal and was repaired immediately. The next week another seal failed. Seal failure or performances continued to plague the unit. About a month later the motor bearings needed to be replaced. When the bearings were replaced, the alignment of the motor, shaft and coupling were checked and found to be beyond specifications. The unit was realigned, placed back into service and the frequency of seal failure or performances dropped nearly to zero. The apparent cause of the seal and bearing failure or performances was poor alignment. The misalignment wore out the bearings and caused excessive vibrations that caused the series of seal failure or performances.

Identically distributed data means the probability distribution from which the "time between failure or performances" are derived is not changing. For failure or performance data where time or some other related variable, such as cycles is used, this means the same probability distribution form can be used to model the failure or performance frequency for the time period under consideration. This assumption implies that the chronological order of the data does not contain any information. In practice the chronological order can contain very important information regarding the future reliability or status of the system.

Consider for example the two systems' failure or performance data in the following table:

|  | Time Between Failures | |
| --- | --- | --- |
| Failure Number | System#1 | System#2 |
| 1 | 10 | 50 |
| 2 | 20 | 40 |
| 3 | 30 | 30 |
| 4 | 40 | 20 |
| 5 | 50 | 10 |
| Mean Time Between Failure | 30 | 30 |
| Standard Deviation | 15.8 | 15.8 |

System #1 shows that the time between failure or performances is increasing with failure or performance number or showing a clear improvement trend. System #2 shows a systematic decrease in the time between failure or performances with failure or performance number or exhibits a deterioration trend. This information is obtained from observing the chronological order in which the failure or performances or events occurred. Yet the mean time between failure or performances and standard deviation of the two very different systems are the same. This example illustrated the importance of examining the chronological order of the failure or performance or events that is an important part of this invention.

There are a several situations that in reality would cause failure or performances or events to be related or not identically distributed. There can be complex inter-system relationships caused internal and external factors that are not always identified, understood, or modeled by the analyst. It is this simple fact that makes the testing of the data for trends a prudent initial phase in the analysis of reliability or event data.

The statistical trend analysis components of this invention are developed to test the data as defined by the analyst for the existence of trends or patterns. If no trend is identified for a specific group then the data is validated as best as possible within the user-defined to be IID. The subsequent optimal interval and maintenance decision support analyses are then technically justified. In the practical analysis of failure or performance and event data, these analysis sections are nearly always relevant since there are safety, environmental and financial costs and for doing and not doing inspections. In the practical application of this invention, there is often insufficient data to statistically justify the IID assumptions which makes the statistical analysis of trends, the inspection interval and decision support the analysis of inspection interval optimization is technically justified. This invention provides analysts with practical tools to address these issues.

This invention provides analysts with a dynamic system and method for the trend analysis of value-based data e.g. condition monitoring data and event based data e.g. failure or performance data. The analyst can enter data in simply formatted data files that can be created in spreadsheet and/or exported to this system from other database programs.

The data values are entered using the taxonomy of the system under study and no data definition conversions are required. The condition monitoring data is compiled and only data values that are within a user-specified time interval are entered into the analysis. The analysts can then combine component of trend data elements to observe trends for a combination of components.

The analyst enters two threshold values where the time of the combined data groups achievement of these values is important. The system automatically computes the forecasted times when the group will achieved these values in terms of actual dates. The forecasting methods applied to the user-specified groups are linear, quadratic, and cubic polynomial fits to the group data. Other forecasting techniques could be applied and the methods used in this and other embodiments are representative of the forecasting methodologies that may be applied to the dynamic, user-specified data groupings of value based data.

For event-based data such as reliability or failure or performance data, the same novel dynamic grouping functionality of component IDs into user-specified groups is applied. Statistical trend analysis techniques are applied to the data groups to compute in the most preferred embodiment up to four estimates of the probability of the existence of a trend. For failure or performance or event-based data, a trend is noted as either improvement where the time between failure or performances (events) is statistically increasing or deterioration where the time between failure or performances (events) is statistically decreasing. The user can visually see the group plots of the time between failure or performances (events) superimposed on three other trend identification methods to assist in the decision process.

Four statistical probably tests are also provided to aid the analyst in identified the existence or non-existence of a trend. These tests represent examples of generally accepted methods for trend identification but other trend identification methods and embodiments may be used alone, supplement or replacement those disclosed herein without departing from the breadth and scope of the invention disclosed herein.

For data groups that have been determined where no trend exists, the invention enables the analyst to compute, e.g., optimal inspection, analysis, or decision intervals and compare the risk associated between strategies, e.g., two maintenance intervals. The inspection and maintenance models used in the preferred embodiment are intended to be representative and other models are within the scope of the invention disclosed herein.

The inspection model produces results for four standard models used in reliability and event analysis: Exponential, Normal, Weibull, and Lognormal probability distributions. Optimal inspection (analysis) results are computed using each of these models to provide the analyst with a range of outcomes. This approach is used since the dynamic application of data groupings by the analyst plus the lack of sufficient data may preclude the determination of the technically best model that fits the data. In practice, reliability results expressed in terms of a range are acceptable in many situations.

Graphical plots of optimal inspection curves as a function of inspection interval also provide the analysts with a visual understanding of the sensitivity of the results to test interval changes. The plots can often supply the interval information at the level of detail practically required in most situations.

In a preferred embodiment, the optimal maintenance support decision include relative cost factors for testing, repair, loss of productivity due to failure or performance, and fixed cost. These four number sum to unity. While these factors are used in the preferred embodiment with respect to a manufacturing environment, one skilled in the art will readily understand that different models may be incorporated into the system and method, and other factors may be accordingly employed without departing from the scope and breadth of the invention disclosed and claimed herein.

The general functional structure of this invention is shown in FIG. 1. A data files is accessed and based on its format [100], the software is directed either to the condition-based or failure or performance/event data modules. Discussing the condition-based operations first the user specifies a time interval over which all analysis will be undertaken in [200]. The next module [300] presents the analyst with a listing of all detailed component IDs that have condition-based data with the prescribed time interval. At this point the user then selects the desired grouping of the basic component data into larger groups that will be analyzed going forward as a single, combined dataset. In [400] the user performs data visualization, trend and predictive analyses. In [500] the analyst can combine component ID if desired to be displayed on the same plot as separate variables and output this information if desired. At any time during the analyses done in [400] and [500] the analyst may return to [300] to re-group the components or to [200] to analyze data over a different time interval.

The failure or performance data is filtered based on the time interval entered in [600]. All data values within the prescribed interval are entered into memory and the user is present with a summary listing of all component IDs that are available to analysis. The user then combines component ID data that is to be aggregated into larger analysis groups in [700]. This is a simple, but powerful function to combine failure or performance/event data to study the reliability or event frequency of failure or performance modes, subsystems or systems comprised of many components. At this point the user can select the trend analysis [800], optimal preventive maintenance interval [900], and the maintenance decision support modules [1000]. The trend analysis modules enables the analyst to print the graphical and quantitative results directly. However, the graphics module [1100] is used to show details, e.g., the unavailability, cost (price), and risk curves as a function of inspection interval. At any time the analyst may either return to enter a new time interval [600] or apply new component ID groupings in [700]. The dynamic nature of this invention refers to this seamless ability: the re-selection of new component ID groupings.

BRIEF DESCRIPTION OF THE DRAWINGS

FIG. 2 is a graphical representation of a spreadsheet or file with data names.

FIG. 3 is a graphical representation of a spreadsheet or file that is available for use according to the system and method provided herein.

FIG. 4 is a graphical representation of the condition-based main module which offers an analyst three main functions of the condition-based analysis data.

FIG. 5 is a graphical representation of how the user would enter Start and Stop dates or times.

FIG. 6A is a graphical representation of monitored variables listed to communicate to the analyst what monitoring variables have data values between the start and stop dates. FIG. 6B shows an example where the analyst has selected to trend all feed water pumps, steam turbine values, and switchgear values together as three groups. The unselected variables are not involved the subsequent data analysis steps. FIG. 6C shows another example where the analyst has selected to trend each monitoring variable separately.

FIG. 9 shows an example where of the nature of the forecasting results for the feedwater pumps dataset.

FIG. 10 is a graphical representation of threshold values and forecast models to provide the corresponding time when each model will achieve the prescribed value.

FIG. 13 is a graphical representation of a data structure for listing significant events or failure or performances.

FIG. 16A is a graphical n example of the compiled data is shown to the analyst. This data arrangement and the reliability changes at the granularity level are chosen by placing a group number component ID beside each group. The software has function keys that enable the user to group component ID in two ways. One function key places all component IDs in a single group and another assigns each component ID in different group number. These two choices are presented in FIGS. 16B and 16C respectively.

FIG. 17 is a graphical representation with insufficient data to be studied alone or no ascertainable trend or pattern information observed.

FIG. 18A is a graphical representation of Group 1 data representing all ECC Valve failure or performances. FIG. 18B is a graphical representation of Group 2 showing that the seal leaks on pumps A, B, & C. occurred early in the time period then for the large majority of the internal there were no failure or performances. FIG. 18C is a graphical representation of Group 3, representing all compressor bearing failure or performances representing the opposite situation. FIG. 18D-E are graphical representations of Groups 4 and 5 showing common situations where there are sufficient failure or performances for the application of several trend analysis statistics and the visually appears difficult to visually ascertain any trend information.

FIG. 24 is a graphical representation of failure data compilation including economic factors in the optimal inspection interval calculation.

FIG. 25 is a graphical representation of optimal inspection intervals that minimizes unavailability, cost, and risk and presents this information in a summary table after a user enters the testing times (T), the repair times (R), and the relative cost factors.

FIG. 26 is a graphical representation of the computational details for all failure or performance probability models of FIG. 25 showing information for Group 5.

FIG. 27 is a graphical representation of tables that enable the selection of specific groups to view plots upon entering the "Graphics" module.

FIG. 28 is a graphical representation of the plotting results for the selected group.

FIG. 29 is a graphical representation of the "Maintenance Decision Support" module using the risk functions R(t) developed in the "Optimal Inspection Interval" section.

FIG. 30 is a graphical representation of scenario results for the question of whether a proposed maintenance strategy represent a high or low risk relative to a base scenario for the application of new predictive technology tools and added staff training.

FIG. 31 is a graphical representation of the results of the decision support analysis of FIG. 30.

DETAILED DESCRIPTION

The following disclosure provides many different embodiments, or examples, for implementing different features of a system and method for accessing and managing structured content. Specific examples of components, processes, and implementations are described to help clarify the invention. These are merely examples and are not intended to limit the invention from that described in the claims. Well-known elements are presented without detailed description so as not to obscure the preferred embodiments of the present invention with unnecessary detail. For the most part, details unnecessary to obtain a complete understanding of the preferred embodiments of the present invention have been omitted inasmuch as such details are within the skills of persons of ordinary skill in the relevant art.

Figure 32:
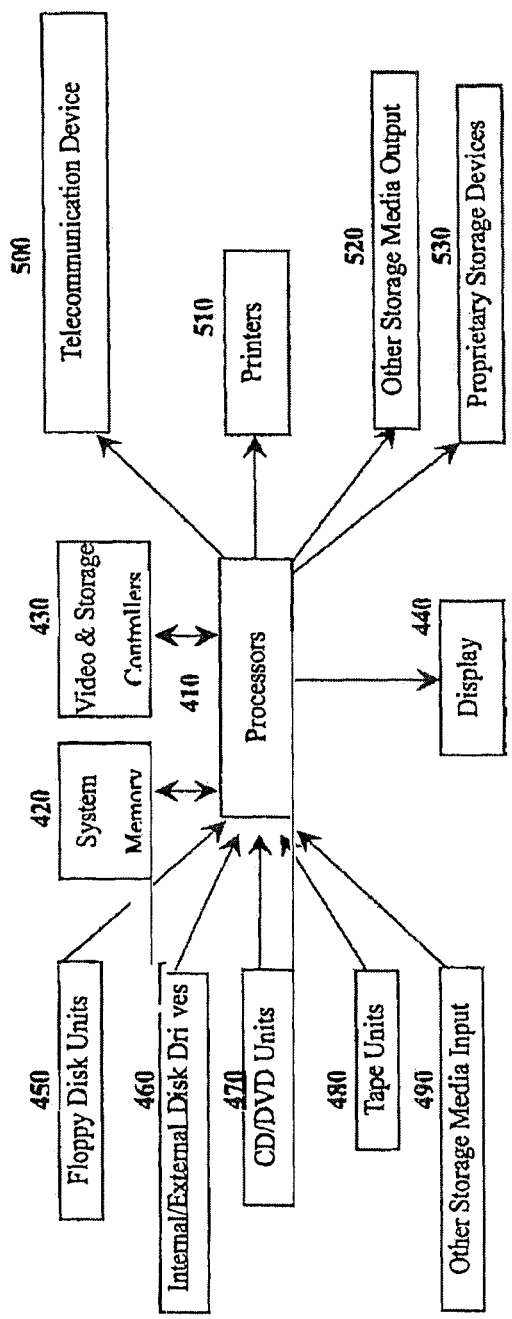
FIG. 32 is a graphical representation of a computing unit with various input and output devices that can be used in accordance with the embodiments of the disclosure.

A preferred embodiment includes a computer implemented method for dynamically analyzing event data for trend analysis of value based data comprising a computing unit for processing a data set, the computing unit comprising a processor and a storage subsystem an input unit for inputting the data set to be processed, the input unit comprising a database of component ID data and event compilations for trend analysis comprising; an output unit for outputting a processed data set; a computer program stored by the storage subsystem comprising instructions that, when executed, cause the processor to execute following steps of (1) uploading condition, failure or performance or event data using the given failure or performance taxonomy, (2) enabling the user to combine failure or performance or condition groups from different basic elements to form new failure or performance or condition analysis datasets, (3) perform condition monitoring or valued based trend analysis, (4) perform statistical trend analysis for failure or performance or event-based data, compute optimal inspection intervals, and (5) apply a risk-based decision-making model for maintenance strategy optimization, and perform various graphical output functions to communicate and document analysis results. A graphical illustration of such a computing unit is depicted in FIG. 32.

The system and method disclosed herein enables the analyst to dynamically combine data elements and trend their values together. Trend information is shown by plotting the combined data element values together, fitting the data to forecasting functions, and given user specified target values of the condition values, forecasted times when the combined data is anticipated to achieve the user-specified thresholds.

Figure 1:
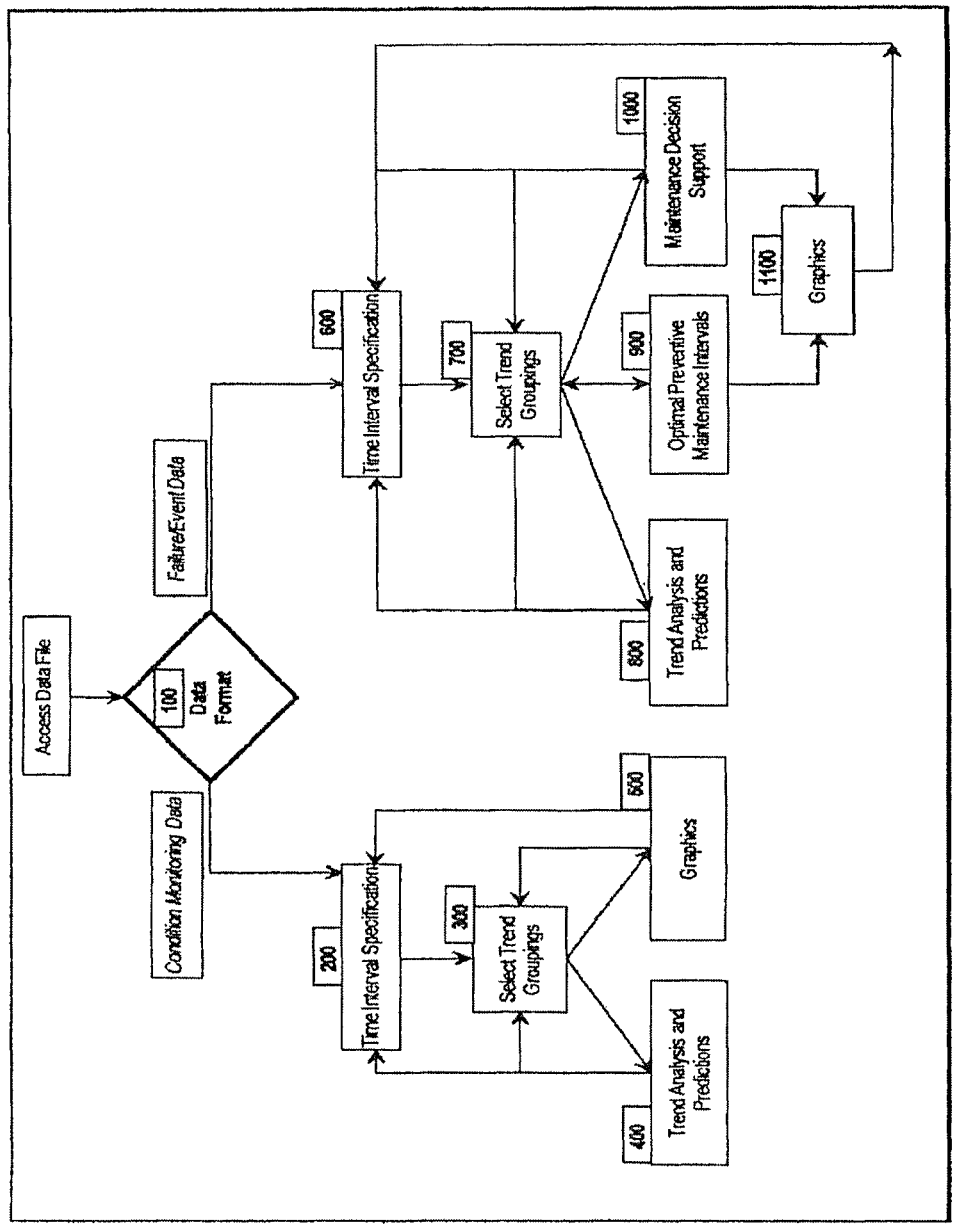
FIG. 1 is a flowchart of how the condition data can be structured is shown in FIG. 1.

The data required for the condition monitoring part of this invention is structured by records where each record has three parts: a time stamp, a monitored variable name, and the observed value or reading from the monitoring activity. An example of how the condition data can be structured is shown in FIG. 1.

The usual functions associated with file import are involved next in the invention. The user enters the data file names and the invention loads the data as given in FIG. 2 into memory. These functions are common data input operations well known computer-related systems.

In one embodiment, in order to compute forecasted times when the data elements are anticipated to achieve specified values, the user will specify, for each monitored variable, values that would represent significant levels for some action to be taken at different priority levels. For example, vibration levels that represent abnormal but acceptable levels may be a useful point to begin to schedule overhaul or other maintenance activities. In another example, a stock value or market level may similarly be set to address whether a particular action may be needed in connection with a security or other asset. This is called the Alert level.

This information may easily be compiled into a spreadsheet or file that is available for use according to the system and method. An example of this information is given in FIG. 3. This file is also automatically entered along with the condition monitoring data.

A second value that can be interpreted as a higher priority threshold is referred to as the Action level, e.g., the sale or acquisition of a security or asset. In the case of securities, event data relating to IPOs, stock buybacks, hostile acquisitions, to generic stock purchases and sales, monetary transactions, internet articles, email alerts, articles in online newspapers such as the Wall Street Journal, financial newsletters, radio & TV transcripts and annual reports, global events, correlations in price movement patterns in response to comments, advice or observations made by knowledgeable experts regarding a particular security or group of securities, such as the acquisition of another company (which may hold some key IP, know-how or personnel within that industry sector) or which is relevant to the future technology direction of the company or losses of some key people or sale of a division which had previously been instrumental in promoting a new technology initiative for the company, which some believe may be strategic to the company, e.g., capturing the "window" of time between when an announcement is made and when analysts themselves physically state their interpretations of announcements containing these similar insights. There may even be a few cases in which a knowledgeable expert may, based upon certain available facts, predict well ahead of the market the likely possibility of a forthcoming event, which has significant impact upon stock value. In this case, if this possible eventuality has distinctly negative implications on price, it may be worth shorting the stock in advance and in anticipation of the possible eventuality or if its implications are positive, a purchase of options may be worthwhile (in lieu of gambling on the actual outcome) and/or, in this case, the expert may introduce a trading rule which anticipates this eventuality (or other possible alternative scenarios). On the other hand, knowledgeable domain experts may state hypothetically such as if X, Y, Z occurs then Stock A will be a good buy for the following reasons. This information, in turn, could be used to write a custom rule to anticipate a potential opportunity such that an immediate trade could be triggered upon such announcement. This rationale as provided (as well as considering the identity of the provided of the argument) may itself contain useful predictive indicators as to the predicted degree of soundness of the rationale. The present invention uses such correlations to develop prediction models.

The condition-based data main module offers the user three analyst options as shown in FIG. 4. This screen shows the three main functions of the condition-based analysis of data for this invention. Once the data is entered into memory, the analyst sees this screen which begins the novel elements of this invention. The analyst is required to enter the "Time Interval Specification" section.

The invention requires the user to enter Start and Stop dates or times. This interval defines the analysis period and only data elements that have data values within this period will be included in the analysis. FIG. 5 shows one embodiment of how the user would enter this information. Given the time criteria, the pertinent condition monitoring database is queried to compile of all data records for given data values that have occurred within the prescribed time interval. The stop date can be a future time to perform trending forecasts and to make the graphic plots of your data more readable.

Once the data is compiled and successfully validated by comparing the monitored variable names in the data file with the monitored variable names given in the Alert and Action file, the invention returns the analyst to the menu screen shown in FIG. 4 and the next stage of analysis is performed by selecting the "Trend Analysis" module. The available monitored variables are subsequently listed to communicate to the analyst what monitoring variables have data values between the start and stop dates. An example of this preliminary analysis structure is given in FIG. 6A. Function keys located at the bottom of the screen provide automated selections for the two straight forward selections of all data elements in the same group and all in separate groups.

With the available data compiled, the analyst selects which monitoring variables to be trended. This is done in a systematic fashion by first placing a '1' beside the monitoring variables to form group 1, then a '2' beside the selected variables to form group 2 and so on. By placing the same group number beside multiple monitoring variables, the analyst selects to trend the combined dataset rather than the individual variables. The analysts can select to analyze individual variables by placing a different group number beside each variable.

In the analysis of condition monitoring data, the flexibility to define larger trend groups by enabling the user to combine data in a stepwise, dynamic fashion is a unique feature of this invention. FIG. 6B shows an example where the analyst has selected to trend all feed water pumps, steam turbine values, and switchgear values together as three groups. The unselected variables are not involved the subsequent data analysis steps. FIG. 6C shows another example where the analyst has selected to trend each monitoring variable separately.

With the trend groups selected the analyst the invention proceeds to plot the combined trend data sets as a function of time. This is the first level in trend identification. The analysts simply observes the plot of the censored and possibly grouped data to visually check for systematic improvement trends, deterioration trends or recognizable patterns in the data indicating some transient causal influences.

Figure 7:
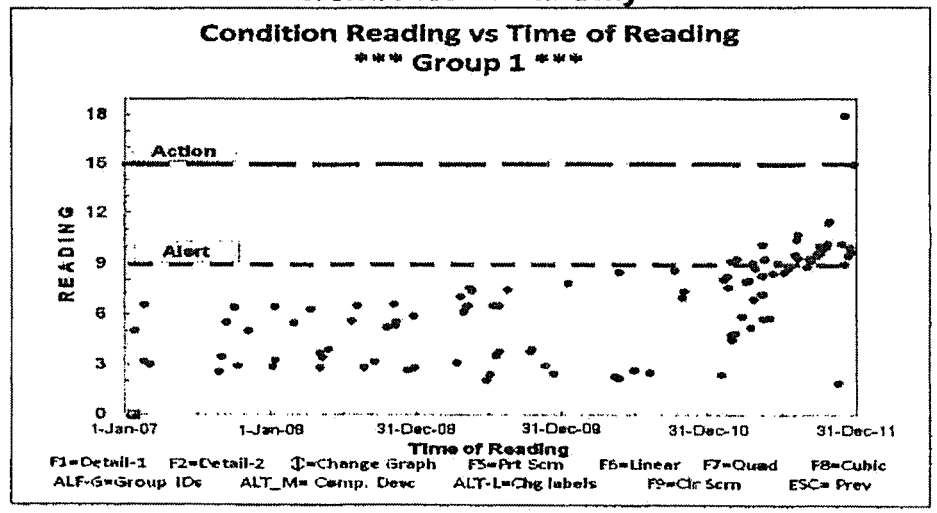
FIG. 7 shows an example of this visual analysis phase. The vibration readings from the Primary and Secondary Feedwater Pumps #1 & #2 readings are combined into new dataset and plotted together.

FIG. 7 shows an example of this visual analysis phase. The vibration readings from the Primary and Secondary Feedwater Pumps #1 & #2 readings are combined into new dataset and plotted together.

Figure 8:
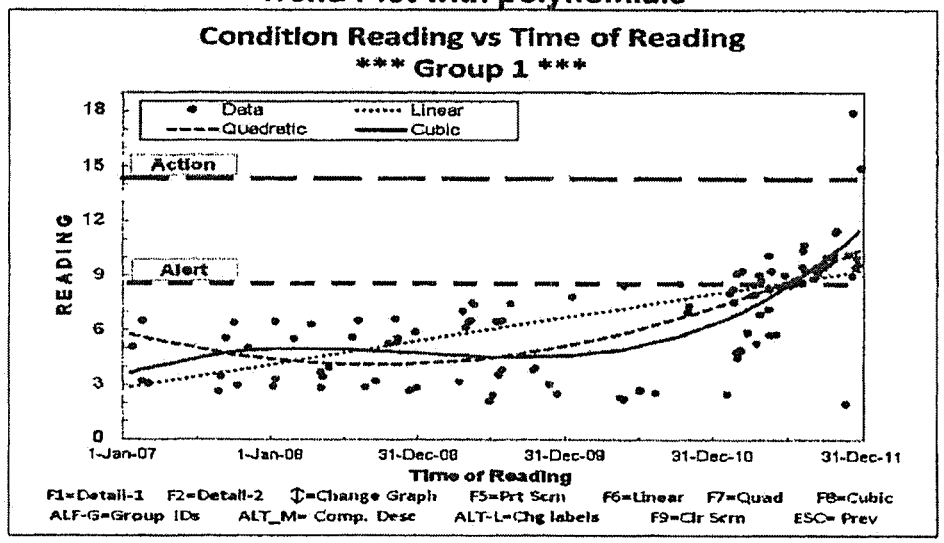
FIG. 8 is a graphical representation of forecasting models to observe the how well the forecasting curves fit the current data for each trend group to linear, quadratic and cubic polynomials.

With the visual trend information now apparent, the analyst can apply forecasting models to observe the how well the forecasting curves fit the current data. One embodiment of the invention fits the datasets for each trend group to linear, quadratic and cubic polynomials. These curves are applied by using function keys as shown in FIG. 8. Other curve fitting and forecast models can be used and the facility for applying the predictive models based on the dynamic trend data grouping constitutes the innovation of this invention.

Based on the Alert and Action values, the forecasting models also provide the times or dates when the trend group models will achieve these values. This functionality is activated by the application of various function keys. FIG. 9 shows an example where of the nature of the forecasting results for the feedwater pumps dataset. The analyst now has visually studied the data trends and can also observe the quality of each forecast model. Based on this information, the analyst gains qualitative knowledge of the forecast results accuracy. Error limits could be applied but in practice, the insights of the analyst combined with the general quality of the forecast models as assessed also by the analysts provides a sound basis as to the overall reliability of the forecast results. However, this invention recognizes that the inclusion of prediction error limits in other embodiments of this invention.

To provide the analyst with dynamic forecast information, by application of the function keys, the analysts can enter a threshold value and the forecast models will provide the corresponding times when each model will achieve the prescribed value. This facility gives the user a dynamic and flexible utility to look at trend forecasting for function values that are not a priori entered into the data files. An example of this utility is shown in FIG. 10. The user has specified the reading of "9.123" as shown by the arrow in this figure. The dates below the arrow show the predicted dates by forecasting model (in this case: polynomial curve fits.)

Based on the application of specific computer keys like the Escape key [ESC], the analyst can return to the initial time screen shown in FIG. 4 and select "Graphics" to determine data plotting groups similar to functionality performed in the "Trend Analysis" section related to combining data elements to be trended together. In this case the variable combinations related to how the analyst wants to present the data for visual representation only.

Figures 11, 12:
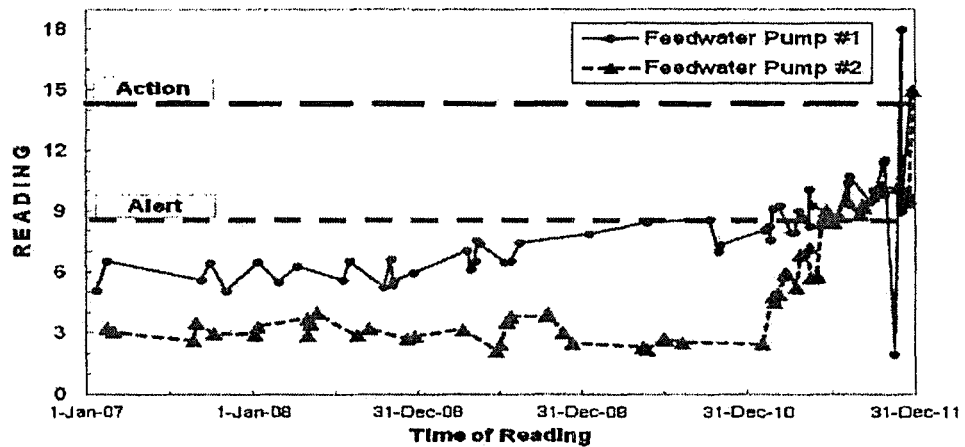
FIG. 11 is a graphical representation of the "Graphics" module with the data variable combination screen present similar to FIG. 6.
FIG. 12 is a graphical representation of condition monitoring values of pumps on the same plot.

Upon entering the "Graphics" module the analyst is presented with the data variable combination screen present in FIG. 11 similar to FIG. 6. In this however, the grouping of data is only for plotting on the same of different plots. The data is not combined for analysis. For example, by placing "1" by both feedwater pump variables, the analyst has selected to plot the condition monitoring values of both pumps on the same plot as shown in FIG. 12.

Based on the application of specific computer keys like the Escape key [ESC], the analyst can return to the initial time screen shown in FIG. 4 and re-compile data over another time interval to perform another analysis. If the user is interested in only re-combining the basic data variables into new trend groups, then they apply the ESC key until only returning to the trend data screen shown in FIG. 5. This facility to return to FIG. 5 to re-select different trend groups provides the analyst with a flexible, dynamic system to gain more performance insights from the available data.

Other function keys are also important for the operation of this invention. There are special keys identified for terminating the session, moving between fields on the screen, various special functions like showing forecasting function curves, and for screen printing. These functions are necessary components of this invention since they provide the analyst a way to interface with the operation of the invention. These operations can be performed either by function keys, mouse clicks on certain fields, through a combination of both or by using other human interface techniques.

Another important functionality of this invention is dedicated to the analysis of reliability or significant event data. This type of data is given by an event name, failure or performance mode label, or other descriptor and a date or time that it occurred. Significant events may be the date of hurricane landfall in the US, when the stock market achieved a given size, gain or loss, or other events that are of interest to track.

The reliability or event data analysis modules require the importation of data in a simple form. The operations associated with loading data into the system are common, standard operations and familiar to one skilled in the art. However, the data structure simplicity represents a key element of making the data input process easy to perform for users of this system.

Reliability data has the same date and descriptor characteristics as significant event data and may be defined at a failure or performance mode, equipment or system level depending on the severity of the equipment, costs, and the reliability culture of the facility. Also, the definition of a failure or performance can vary widely from simple abnormal condition monitoring readings requiring unscheduled maintenance to catastrophic loss of system function. This invention utilizes data in whatever taxonomy used thereby eliminating possibility of data miscoding due to transforming an individual plants' data definitions into some software required categories.

The data structure required for this part of the invention is a listing of significant events or failure or performances. An example of one embodiment is shown in FIG. 13. The failure or performance modes in this case, are represented by a date (or time stamp) followed by a description of the corresponding event or failure or performance mode name.

Figure 14:
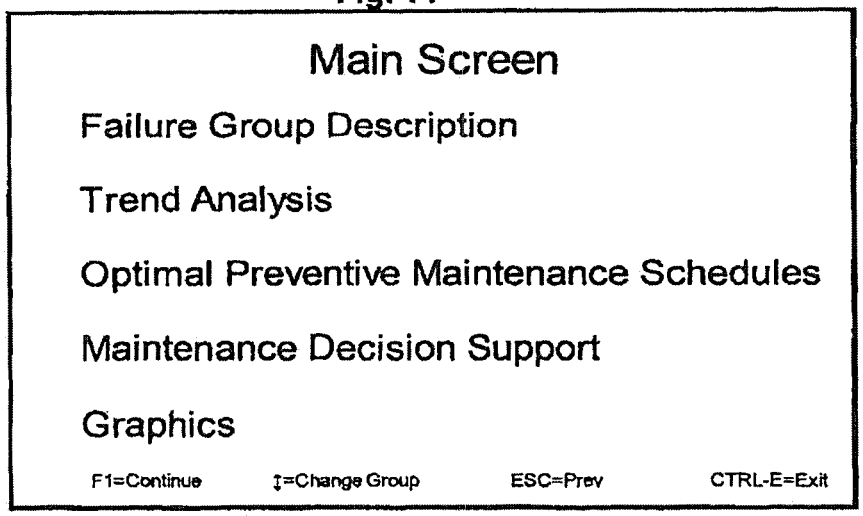
FIG. 14 is a graphical representation of a main screen used to access various computational options.
Figure 15:
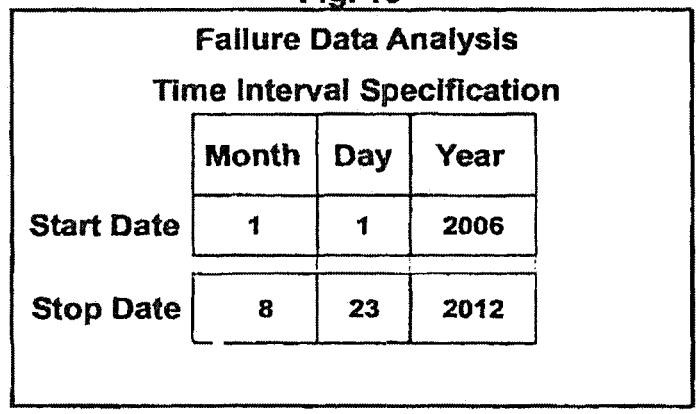
FIG. 15 is a graphical representation of the "Failure or performance Group Description" module to customize the data acquisition with time interval data.

With the data file accessed by the system the analyst is presented with the module selection choices shown in FIG. 14. The "Failure or performance Group Description" module needs to be selected first to customize the data acquisition. The analyst must enter the time interval for data selection such as the dates shown in FIG. 15. In practice as situations and plants evolve using all of the historical data presents non-intuitive results. More data does not always provide more precision in forecasting future results. For example, suppose a facility implemented a major new reliability program two years ago and management wants to understand and quantify the program changes if any. Since the program has been in effect for two years, the analyst may select a time interval that goes back four years. This interval provides one strategy on how to measure if the reliability has indeed changed with the new program. Going back say 10 years could give too much weight to the "old" data and present a bias in the results. For this reason, the analyst can select the time interval over which trend results are judged as relevant.

Given the time filter, only data records inside this interval are recorded. An example of the compiled data is shown to the analyst in a format displayed in FIG. 16A. This data arrangement and the functionality it provides represent unique parts of this invention. At this point the analyst can study reliability changes at the granularity level of their choice by placing a group number component ID beside each group. To facilitate this task for the user, the software has function keys that enable the user to group component ID in two ways. One function key places all component IDs in a single group and another assigns each component ID in different group number. These two choices are presented in FIGS. 16B and 16C respectively.

The automated choice of placing component IDs into their distinct groups may be used for example if the analyst is scanning for changes in reliability over the entire system configured in the dataset at the most detailed level defined by the data. Combining all of the components together into one group may be used if the analyst is interested in reliability changes at the macroscopic system, unit, plant, company or over the entire span of assets where event data has been recorded.

These two choices are only two of several options available to the analyst. The analysts can choose what component IDs to combine into distinct groups that represent reliability items of current interest. This component combination functionality enables the data to be scanned many ways for trends and patterns in event data that may not be obvious from the basic component data. For example, there either may be insufficient data or no trend results for individual component IDs but combining a subset of them into a group may show a trend or other pattern in the data.

For example referring to FIG. 17, suppose that the analysis of component data in either has insufficient data to be studied alone or there is no ascertainable trend or pattern information observed. However, the combined grouping shown here is just but one choice the analyst can make to observe reliability changes related to looking at the data from one point of view or strategy:

Group #1 All failure or performances for the ECC values in both the failure or performance-to-open (FTO) and the failure or performance-to-close (FTC) modes.

Group #2: All seal leak events for the pumps.

Group #3: All compressor bearing failure or performance events for the turbines.

Group #4: All motor failure or performances.

Group #5: All turbine failure or performances.

Another embodiment of this invention would be to automate the group formation process to systematically or randomly examine reliability changes between all or some pre-defined set of component IDs. The combination method could be related to the data taxonomy, the number of data items in each component ID or some external criteria determined by the analyst.

Once the component IDs have been combined into user-selected groups, the first analysis phase, is to combine the failure or performance times into one dataset for each group. This is depicted graphically for each group in FIGS. 18A-E. Each grouping represents a different example of the application of this invention. In these figures. The failure or performance times for each component ID are indicated by markers on separate lines. The group time between failure or performance dataset in each case is produced as the projection of all component failure or performances into a single timeline. This projection is a non-intuitive function that is well-known to analysts skilled in aspect of these operations. Each group example here represents a different example of the trend analysis functionality and utility.

Group 1 data representing all ECC Valve failure or performances at first glance, shows possibly an improvement trend. There appears to be more failure or performances in the first half of the time period than in the second half. However, the difference may be due to normal statistical variability inherent in valve reliability and the analyst needs to understand the operating conditions of the equipment over the time interval. If the operating environment was different in the first half than the second half then the analysis of failure or performances over the entire interval needs to be interpreted taking this fact into account.

Group 2 shows that the seal leaks on pumps A, B, & C. occurred early in the time period then for the large majority of the internal there were no failure or performances. Assuming the operating conditions of the pumps hasn't changed then is it is apparent that the root cause of failure or performances has been identified and the problem corrected. The correction may be a change in the preventive maintenance or application of new predictive maintenance technologies that identify seal deterioration. With this knowledge, maintenance and operations staff can schedule seal changes into planned maintenance schedules thereby eliminating the safety, costs, and environmental issues that can be associated with unscheduled seal failure or performances. This test statistics applied in this invention identify this improvement reliability trend. Improvement trends can exist in two ways. There may be a large amount of failure or performances or events where the time between events is consistently getting or as in the situation described by Group 2, failure or performances occur early in the time period then no failure or performances are present for the large portion of the time interval.

Group 3, representing all compressor bearing failure or performances represents the opposite situation. In Group 2, all failure or performances occurred in the beginning of the time interval. In Group 3, all failure or performances occur in the second half of the time interval. This situation is emblematic of a deterioration trend.

Groups 4 and 5 represent common situations where there are sufficient failure or performances for the application of several trend analysis statistics and the visually appears difficult to visually ascertain any trend information. It is important to note that the visual representation of the time between failure or performances of the user-specified aggregation of component IDs is time consuming, subjective, and can produce different conclusions from different analysts. The purpose of FIGS. 18A-E is to provide a connection between the trend results and the test statistics. The plots of this information however represent important data for developing trend conclusions as will be shown in subsequent paragraphs describing this invention.

Once the analyst defines the component ID groupings, the invention performs the failure or performance or event compilations and allows the user to review a trend analysis summary for each group, including:

statistical estimates for the probability of the trend in each group,
  mean time between failure or performances, in days, for each group,
  predicted time until next failure or performance, in days, for each group.

Figure 18A:
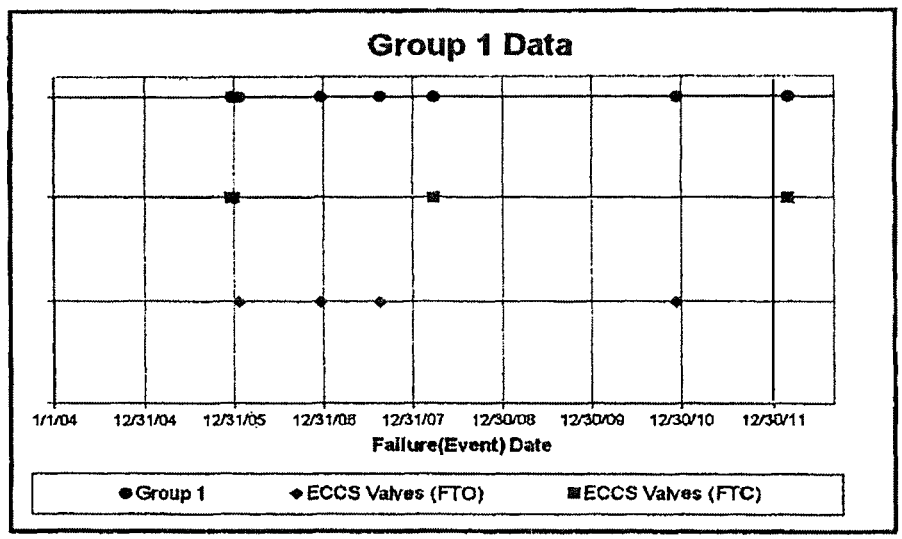
FIGS. 18A-E. are graphical representations of failure or performance times into one dataset for each group.
Figure 18B:
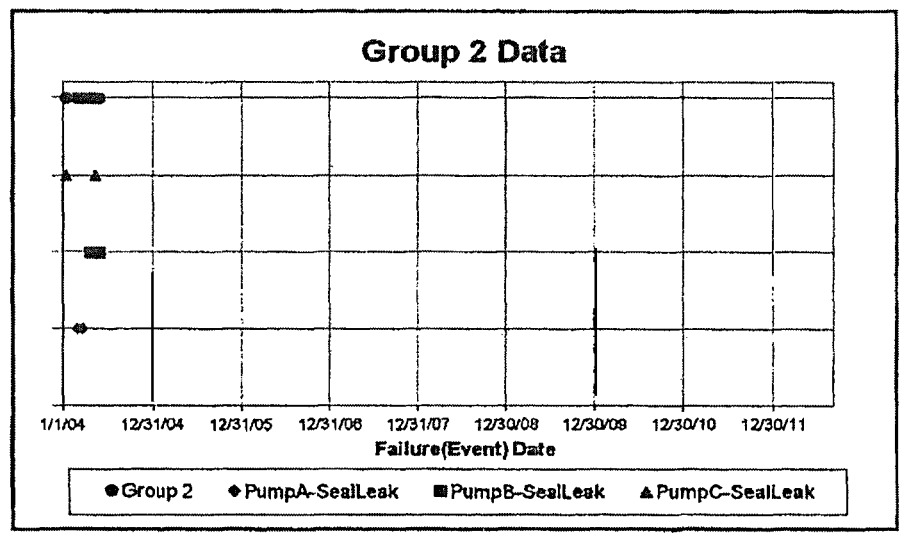
Figure 18C:
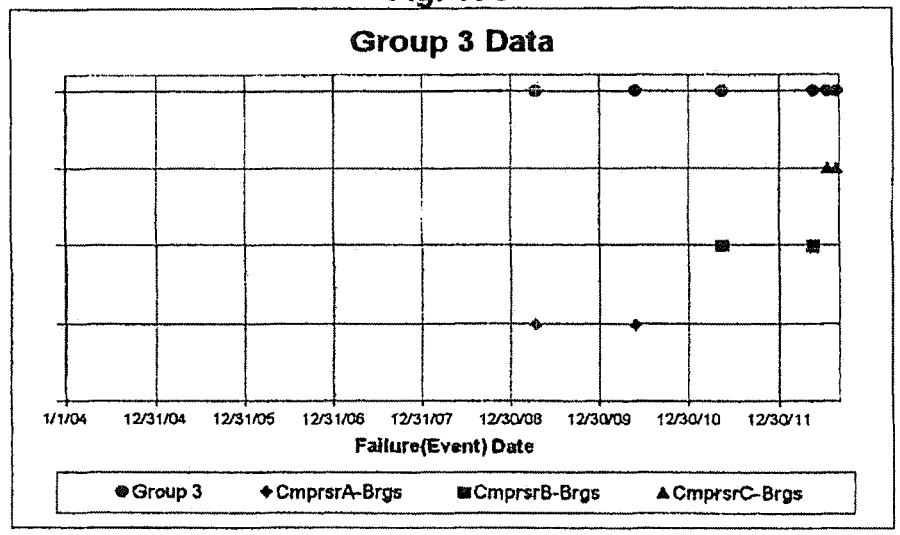
Figure 18D:
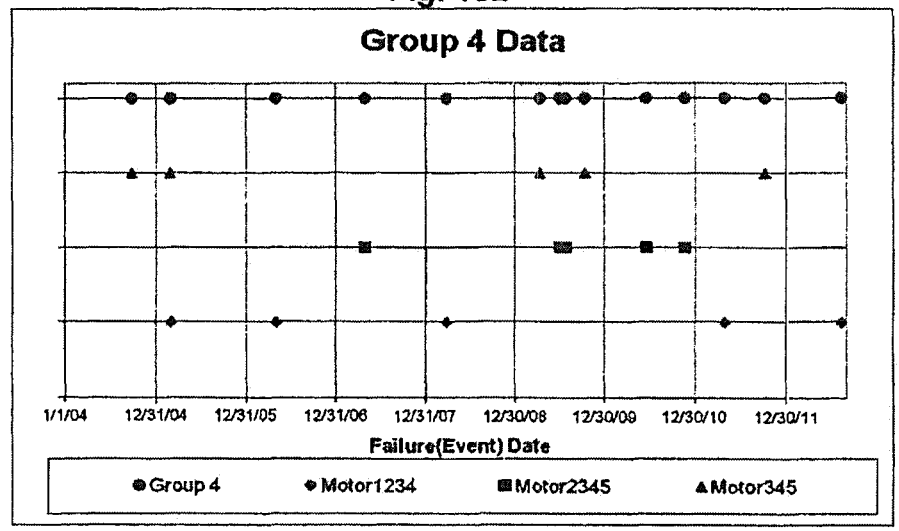
Figures 18E, 19:
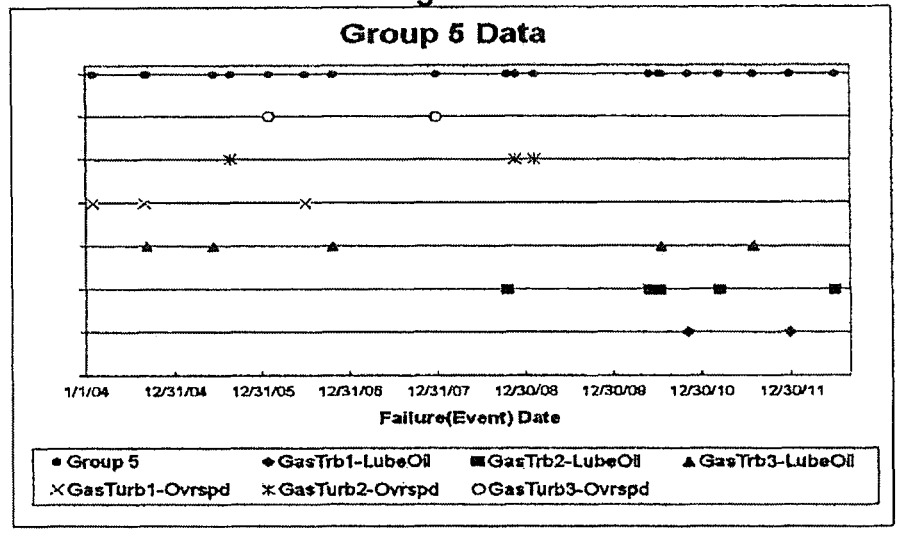
FIG. 19 is a graphical representation of summary trend information applying two statistical trend methods: the Laplace and the Military Handbook-189 tests statistics.

An example of this information for the five selected groups shown in FIGS. 18A-E, is presented in FIG. 19.

This analysis phase presents the user with a summary of trend information as s pre-screening tool. The user selects from this preliminary trend information which groups are of interest to study further. The user can use a special function key to shortcut the manual selection process to automatically select all groups for further study.

The failure or performance statistics applied in this example are practical, industry-accepted measures of reliability growth or trend identification. Since failure or performance or event data represent stochastic points in time, there is an inherent uncertainty with inferring trend-based conclusions. Consequently the invention provides the user with the probability or likelihood estimates of the trend existence. It is important to note, however, that although these predictions employ highly reliable statistical models, they are still estimates. Even when the probability is as high as 0.99 (99%), there is no guarantee the predicted time until the next failure or performance will be accurate. The final decision that a trend or pattern does or does not exist must be made by the person familiar with the systems, components, and failure or performance IDs under analysis. The invention presents the statistical trend information in both graphical and numerical formats from which such trend decisions can be made. There are many trend identification models that could be included in various embodiments and are examples used here are intended to represent one application. For example, the identification of data trends implies a specific pattern in the data and another identification method that could be used in the invention is the Maximal Information Coefficient that can identify complex patterns in data that are not achievable with standard statistical methods. The test statistics used in this description of the invention are for illustration only. Other trend identification tools and statistical tests could either be used as supplements to or replacements for the ones applied in this embodiment of the invention.

An example of the summary trend information shown in FIG. 19 applies two statistical trend methods: the Laplace and the Military Handbook-189 tests statistics. The methods are used to produce two separate probability estimates of the existence of either an improvement or deterioration trend.

The Laplace and MIL-HBK-189 tests used in this embodiment of the invention are standard methods in reliability growth analysis that can identify trends where the rate of occurrences of failure or performances or events varies with time compared to a statistical process where it is constant. These tests use a specific formula for the rate of occurrence of failure or performances. If R(t) is the rate of occurrences of failure or performances at time, t, the general equation used in the derivation of these two test statistics is:

$$R(t) = \lambda \beta \exp(\beta - 1)$$

Beta ($\beta$) is called the growth parameter. If $\beta=1$, then the rate of occurrences of failure or performances is a constant and the system reliability does not change with time. If $\beta>1$, the system reliability is decreasing and a deterioration trend is present. If $\beta<1$, then the rate of occurrence of failure or performances is decreasing and an improvement trend is present. The reciprocal of R(t) can be interpreted as the instantaneous mean time between failure or performances at time t. Both $\beta$ and $\lambda$, are computed from the data and the total time period under analysis using methods common to those skilled in stochastic process methods.

The Laplace Test was designed to test for the existence of possible improvement or deterioration trends by comparing its results to a Poisson process where the rate of occurrence of failure or performances is a constant. It is one of relatively few tests found to be useful for small datasets {n (number of failure or performances)>4}, as well as large datasets. It utilizes the time between failure or performances and the total time period under analysis. The times between failure or performances are added together to produce a sequence of data values which are the total times to failure or performance measured from the time of the first observed failure or performance. If $t_1 < t_2 < t_3 < \ldots < t_N$ are the times to failure or performance and T is the total time period ($t_N \leq T$), then the Laplace statistic, U, is conforms approximately to a normal distribution.

$$U = \frac{\sum_{i=1}^{N} t_i - \frac{1}{2} - NT}{T\sqrt{\frac{N}{12}}}$$

The MIL-HBK-189 statistic is a chi-squared distributed statistic with 2N degrees of freedom using the same data as the Laplace formula. The test is also designed to identify improvement and deterioration trends compared to a Poisson (constant rate of occurrences of failure or performances) process.

$$\chi^2_{2N} = 2\sum_{i=1}^{N} \ln\left(\frac{T}{t_i}\right)$$

Predictions for the time to the next failure or performance or event or PTNF, can be important information and the current embodiment information provides two estimates. The first prediction utilizes the equation given in paragraph 67 with the parameters β and λ computed from for each group's data using methods common to analysts skilled in this art. To obtain the time to the N–1$^{st}$ failure or performance or event, the equation is integrated from $t_N$ (which is known to $t_{N+1}$). The result produces the first estimate of the predicted time to the next failure or performance or event given by $$t_{n+1} = \left(t_n^\beta + \frac{1}{\lambda}\right)^{1/\beta}$$

The Mean Time Between Failure or performances or MTBF is computed as the simple average of the time between failure or performance data values. The difference between the MTBF and the PTNF can provide additional trend insight. The difference between these values represents the strength or steepness of the trend. The Laplace and Mil-I-MK-189 probabilities provide the analyst with the likelihood that a trend exists but does not provide any information on the nature of the trend. It is entirely possible that the test statistic probabilities could both indicate a high confidence of either an improvement or deterioration trend but if the PTFN is about the same value of the MTBF, then the trend is nearly flat. This situation suggests that there is a high confidence of a very slow or no trend in the failure or performance or event group. If the PTNF is judged significantly larger (smaller) than the MTBF then the improvement trend is interpreted as a steep increase (decrease) in reliability.

Analyzing the summary information on FIG. 18, the user selects the groups to study in more detail by using keyboard inputs as directed by the function keys at the bottom of the screen. The more detailed analysis begins with a graph of the time between failure or performances for the grouped data as a function of failure or performance number super-imposed on several analysis results. Two examples are discussed to exhibit some of the functionality of this invention.

The first case uses Group 2 whose failure or performance data timeline is plotted in FIG. 17B. This situation presents a practical situation where the group experienced several failure or performances early in the analysis period but then had no failure or performances for the remainder of the time period. Notice first that from the summary trend information shown in FIG. 18, the MTBF is 27 days but the PTNF is 522 days. This difference may represent a very steep improvement trend. Just analyzing the failure or performance data alone without consideration for when inside the time period the failure or performances occurred may provide insufficient information for an accurate identification of trends. Like in this group, the time between failure or performances for the dataset itself shows a deterioration trend but the fact that there were no failure or performances for the large majority of the time period is not included in the regression since there were no failure or performances. The plot shown in FIG. 19 for the time between failure or performances versus failure or performance number shows these facts visually. The straight line plot is computed as a simple linear regression fit to the data and the line provides an indicator (based on only the data) as to the increase or decrease in the time between failure or performances. This line is extrapolated to the N+1$^{st}$ failure or performance to provide a visual estimate of the predicted time to the next failure or performance.

The nonlinear estimate for the PTNF computed from [0060] is depicted on the data plot using by the symbol † at the N+1$^{st}$ value on the time between failure or performance or horizontal axis.

The fourth visual trend indicator is computed as the MTBF as a function of failure or performance number. The closer this function is to flat or zero slope, the more valid the assumption of a constant failure or performance rate or no trend. The validity of this assumption can be judged by simply looking at the dotted line varies or does not vary as a function of failure or performance number. This is a subjective by very powerful information for the analyst in the identification of trends or no trends. However in this case without new data, this indicator can also be misleading.

Figure 20:
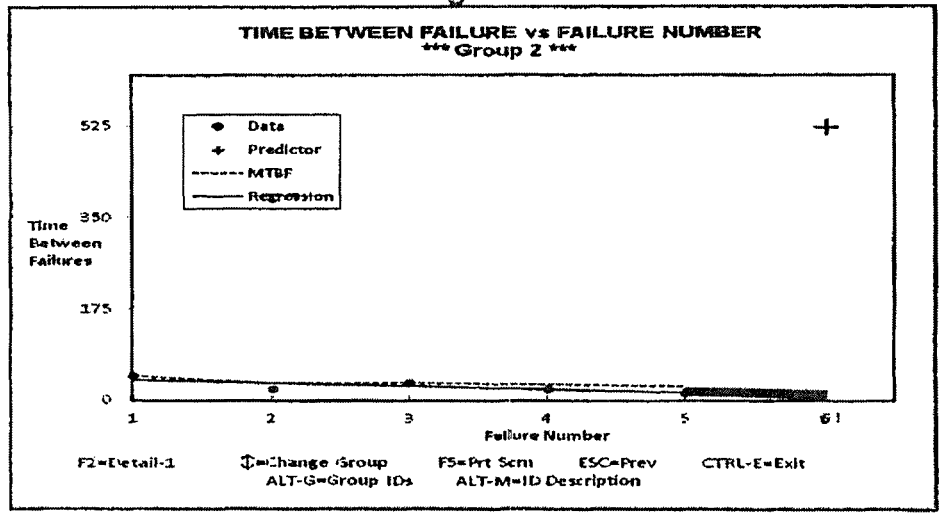
FIG. 20 is a graphical representation of the next level of analysis detail of FIG. 19 for Group 2 showing quantitative results of what was visualized in the preceding view.

By application of the function keys as shown along the bottom of FIG. 19, the analyst can select the next level of analysis detail. An example for Group 2 is shown in FIG. 20. The screen content presents the quantitative results of what was visualized in the preceding view. The first two test statistics, Laplace and Mil-HBK-189, viable for small data sets, are powerful indicators that a trend may be present. The Spearman Rank Correlation rank test, labeled Rank Test in this embodiment, is a common trend test statistic mostly applied to large datasets. It is a nonparametric test that inherently does rely on the distribution of the underlying data and its technical development and representation is known to analysts skilled in this art. The linear regression probability is computed from the probability that the sign of the value of the slope is either positive or negative. The four trend tests represent only one embodiment of trend test statistics. Other trend indicators could be used instead of or in addition to the ones shown here.

The Laplace and Mil-HBK-189 tests that consider the failure or performance and time period data together both indicate a high likelihood of improvement. However, the Rank Test and Linear Regression estimates that use only the failure or performance data values, show a high likelihood for deterioration. This result suggests that when the failure or performances occur within the time interval in addition to when the failure or performances relative to each other can be important information in identifying trends.

The PTNF values depicted up to this point in the analysis have been in terms of the time from the last failure or performance. This frame of reference is difficult to apply in practice. The next section in FIG. 20 translates the PTNF values to actual dates using the date values in the group dataset so the analyst is informed directly as the specific date the models predict the next failure or performance. These values are estimates, and the analyst must factor other subjective information into the confidence place in these dates. Ranges could also be entered yet the ranges could be too wide to provide any meaningful information. This embodiment provides the model direct estimates and relies on the insights and judgment of the analyst to conclude their accuracy.

Figure 21:
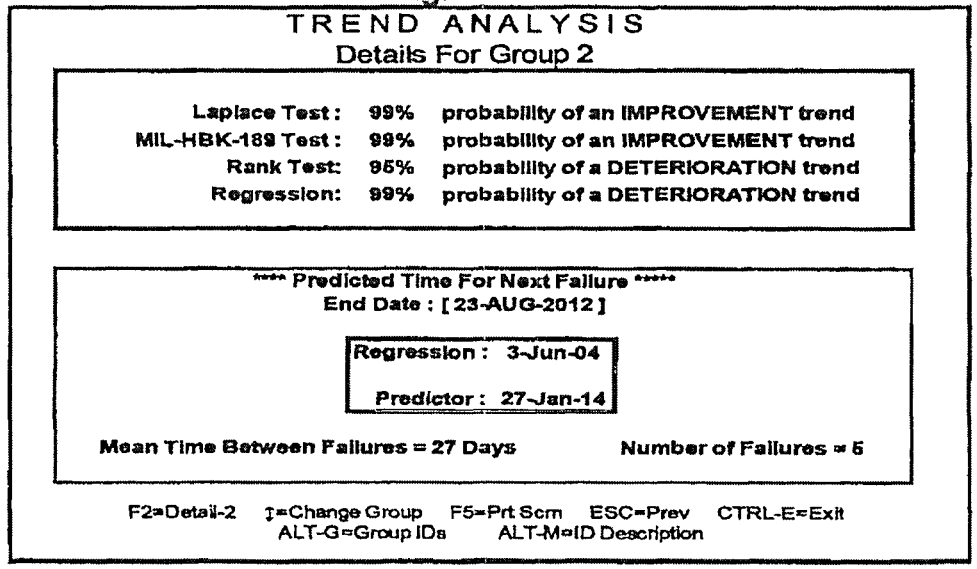
FIG. 21 is a graphical representation of time between failure or performances versus failure or performance number plot and PTNF estimates.

The second example is for Group 5 in FIG. 18. The data timeline is shown in FIG. 17E. The time between failure or performances versus failure or performance number plot and PTNF estimates are shown in FIG. 21. The data points, shown in FIG. 21, provide the analyst with valuable insights about the timing characteristics of the failure or performances or events in Group 5. In this case, there are a relative large number of failure or performances and apparently no time bias from observing FIG. 17E or FIG. 21. This plotting format can depict distinct patterns in the time between failure or performance data that are possible clues to the root causes of the failure or performances. This subjective information represents extremely valuable data-driven evidence to direct additional research on root cause analysis or other activities designed to understand the fundamental causes of failure or performance or event frequency. The patterns may not be recognized by classical statistics. This is why the visual representations are an important part of this invention. Analysts in collaboration with system experts can use the failure or performance pattern information to learn more about the complex nature of system failure or performance or event frequency.

Figure 22:
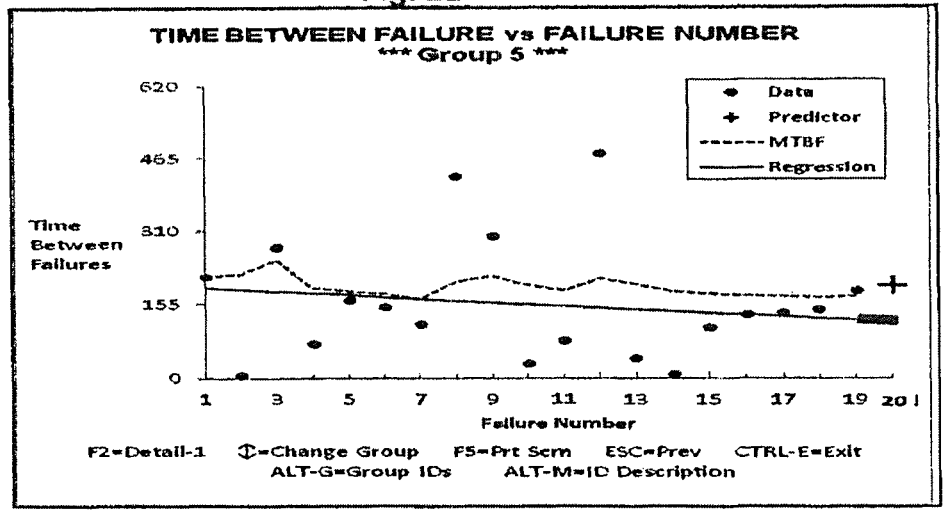
FIG. 22 is a graphical representation of time between failure with visual plot characteristics of a constant failure or performance rate.

Advancing to the next level of detail by application of the function keys shows a different results than observed for Group 2. The trend analysis detail is shown in FIG. 22. In cases where the trend probabilities are high >90% and all of the statistics agree on the nature of the trend (improvement or deterioration), trend identification is relatively simple. However, the example depicted in FIG. 22 finds the trend probabilities are all relatively low, the trend types do not agree, and the visual plot show characteristics of a constant failure or performance rate. In this case, the analyst may conclude that there is no trend in the data. Another way of stating this fact in practical terms for the turbine over-speed and lube oil failure or performance modes, is to conclude the reliability of these systems has not changed over the analysis time interval.

The invention in this the preferred embodiment enables the user to combine component failure or performance to analyze reliability at various levels of system hierarchy. The predicted times to the next failure or performance (PTNFs), the four trend probabilities with associated trend information, and the visual plots of group time between failure or performance data together provides the analyst with a robust framework for trend identification.

The analyst may advance one screen further in results detail to study the reliability parameters used in the test statistics and linear regression. This data may be useful for the additional more detailed calculations and they are simply listed in tabular form. This presentation demonstrates the utility of this invention in computing reliability parameters that can be applied to other calculations that may be developed based on the trend information learned from the preceding analysis screens. Additional insights can be achieved by varying the time interval and dynamic re-grouping of the basic failure or performance or event data into analysis groups. This iterative process of studying results of a given strategy and going back and performing additional trend analyses with different component ID groupings and/or different time is novel and part of this invention. At any point in the analysis the user may return to the main module screen by use of mouse clicks, the ESC Key, or the CTRL-E function key.

Figure 23:
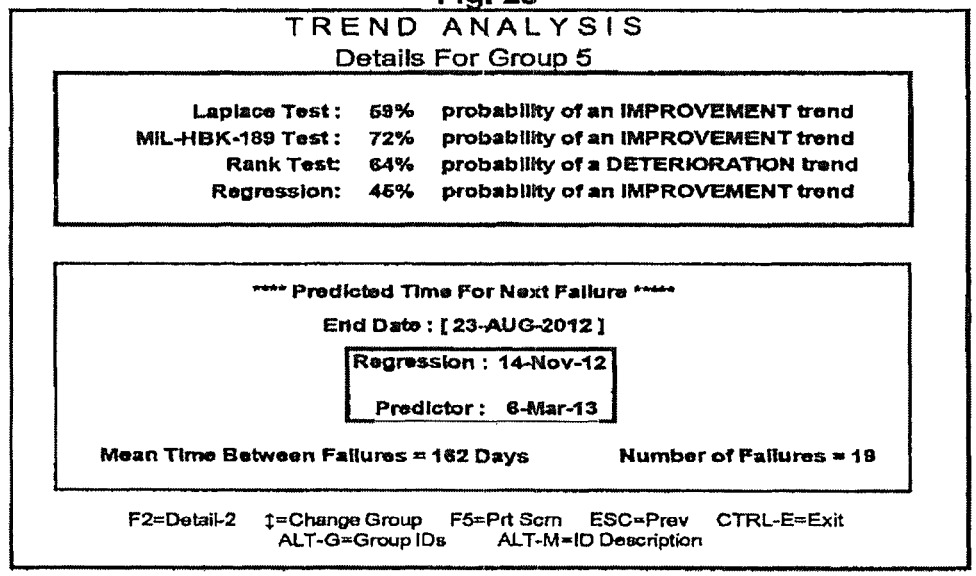
FIG. 23 is a graphical representation of a data input format for the Optimal Inspection interval module.

With the trend properties of the groups analyzed the user may return to the main screen shown in FIG. 14 to access the other computational options. Typically, the next step in the analysis of event data is to compute optimal inspection intervals for the user pre-defined failure or performance or event groups. Based on the trend identification results, the analyst may select only groups with no identified trends for study or include others where a trend may possibly be present but clear conclusion can be made. In some cases, the trend analysis results may not be conclusive. The Optimal Inspection interval module first requires the analyst to enter average testing and repair timed for each group. These parameters represent the data required for the particular inspection interval model used in this embodiment of the invention. Different embodiments may use different inspection interval models requiring different parameters. An example of the data input format for this embodiment is shown in FIG. 23.

The special function keys ALT-G and ALT-M are designed to provide the analyst with group and component ID information. ALT-G lists the component IDs within a specific group and ALT-M provides a description of a component ID.

To include economic factors in the optimal inspection interval calculation the user enters relative cost factors as shown in FIG. 24. The factors in this embodiment define the relative amount of total expense for each group associated with testing, repair, loss of productivity due to failure or performance, and fixed costs if any. These relative cost factors serve a weighting factors $\{c_i\}$ for the cost and risk functions used to compute optimal (minimum cost and risk) inspection intervals.

This embodiment of the invention incorporates an optimal inspection model that is related to the following equations. This is one of several models that could be employed in other embodiments of this invention. $Q(\tau)$ is the group unavailability (probability of system not functioning on a random demand) as a function of test interval T, $C(\tau)$, and $R(\tau)$ are the group cost and risk functions respectively:

$$Q(\tau) = \frac{T}{\tau} + \left(1 + \frac{R}{\tau}\right) * \left\{\frac{1}{\tau}\right\} \int_0^\tau F(s)ds$$

$$C(\tau) = \frac{T}{\tau} C_{testing} + \left(C_{failure} + \frac{R}{\tau} C_{repair}\right) * \left\{\frac{1}{\tau}\right\} \int_0^\tau F(s)ds + C_{fixed}$$

$$R(\tau) = Q(\tau) * C(\tau)$$

where:

$\tau$ = test interval $F(s)$ = system failure or performance probability by time $s$ $T$ = average testing time $R$ = average repair time $\{C_{testing}, C_{repair}, C_{failure}$ or performance $C_{fixed}\}$ = relative cost factors Once the user enters the testing times (T), the repair times (R), and the relative cost factors, the invention computes the optimal inspection intervals that minimizes unavailability, cost, and risk and presents this information in a summary table as shown in FIG. 25. For each group, the system computes the range of optimal interval results from the four probability distributions: exponential, weibull, gamma, and lognormal applied to modeling system reliability, F(s).

The analyst can then select the group to observe the computational details for all failure or performance probability models. An example of this information for Group 5 is presented in FIG. 26.

Once the optimal interval details are known the analyst may want to examine of the sensitivity of the results. The simplest way to accomplish this task is to display the plots of the Q, C, & R functions as a function of test interval. These operations are performed in the graphics module from the module selection screen shown in FIG. 14.

Upon entering the "Graphics" module, the analyst is presented with a table that enables the selection of specific groups to view the plots. When the plot selection is performed, the maximum test interval for the plots is then entered to complete the plot data input process as shown in FIG. 27.

The plotting results for the selected group is presented in FIG. 28. The typical unavailability, cost, and risk plots show this type of structure. The portion of the curve with negative slope is emblematic of over testing where the excessive testing is causing the system to be unavailable. The portion of the curve with positive slope signifies under-testing. The model assumption here is that testing at a higher interval frequency (or short testing intervals) would catch the precursors to failure or performance. The visual representation of the analytical results for the dynamic component ID groupings provides valuable additional insights on how to plan inspection intervals for systems, subsystems, equipment, and components.

The "Maintenance Decision Support" module uses the risk functions R(t) developed in the "Optimal Inspection Interval" section. This module contrasts the risk associated between maintenance strategies for a user-specified group. Given the group selection and the entry of the average testing and repairs times, the analyst is presented with the opportunity to enter different relative cost factors that would be represented of a different maintenance strategy. An example is shown in FIG. 29.

This invention provides a practical framework for studying the effect of different maintenance scenarios. The relative cost factors are loaded with the factors used previous in the analyses although they can be changed here to reflect a different comparison base. A possible strategy for the selection of the parameters shown in FIG. 29 is that Scenario Two reflects a change in inspection activities. The relative cost of testing is increased to reflect the application of new predictive technology tools and the added staff training. It is estimated that the added testing costs will cause a significant reduction in unplanned maintenance and a slight repair in repair costs. The question is does the proposed maintenance strategy represent a higher or lower risk relative to the base scenario.

The detailed scenario results are shown in FIG. 30. The user then enters the inspection interval which represents the value of the inspection interval used to evaluate the two risk functions: to. The invention computes the ratio $$S = \frac{R(t_o\{c\}_1)}{R(t_o\{c\}_2)}.$$

If S<1, Scenario One has the lower risk and if S>1, then Scenario Two has the lower risk.

The results from the decision support analysis presented in FIG. 31 provide the analyst with as much information as possible in the complex of risk function optimum test intervals. The value of S for each failure or performance model are computed, and the scenario relative cost factors for each scenario are presented for reference.

The system and method disclosed herein provides a powerful, yet easy-to-use tool for analysis of your installation's condition reading and failure or performance data. With the condition monitoring features allows a user to: automatically utilize powerful statistical tools to gather evidence that a trend does or does not exist among the data values, use the trend analysis results to make predictions of when the equipment readings will achieve critical values you've established interactively select a reading value and observe the time when the reading is forecasted to reach that value, transfer data simply from spreadsheet or database software, select the time intervals to perform the trend analysis, combine data from different equipment to enable trending a "family" as well as each individual piece of equipment or component.

With the failure or performance data analysis features of the system and method a user can-compare multiple different statistical analysis methods of trend analysis observe failure or performance trends by component or by subsystem, grouped as user specified or for the entire system, for the time period selected, determine optimal test intervals, based on user specified criteria, e.g., cost, risk, or probability, produce graphic representations of failure or performance patterns, simulate effects of changes based on user specified criteria, e.g., testing, repair, failure or performance, and fixed cost allocation and create and update databases to record failure or performances.

We claim:

1. A computerized method, the method comprising:
generating, by a computer processor, at least one ad hoc grouping of component datasets associated with a respective at least one subset of a plurality of physical components according to a respective at least one data taxonomy;
wherein each physical component of the plurality of physical components is associated with at least one value-based data item representative of at least one of:
  i) at least one condition of a respective physical component and
  ii) at least one event related to the respective physical component;
receiving, by the computer processor, via a computer graphical user interface, a user selection, identifying at least:
  1) the at least one ad hoc dynamic grouping and
  2) a specified time interval;
obtaining, by the computer processor, component data in the component datasets of the at least one ad hoc dynamic grouping based on the specified time interval;
generating, by the computer processor, a single dataset file from the component data;
applying, by the computer processor, at least one statistical trend analysis technique to the single dataset file to determine at least one trend in the component data;
transforming, by the computer processor, based at least in part on the at least one trend in the component data, the component data into an operational group model to model failure and performance for the at least one subset of the plurality of physical components of the at least one ad hoc dynamic grouping of the single dataset file; and
causing, by the computer processor, based at least in part on the operational group model, to generate a statistical prediction of future performance of the at least one subset of the plurality of physical components of the at least one ad hoc dynamic grouping of the single dataset file.

2. The method of claim 1, wherein the plurality of physical components and the at least one event are selected from the group consisting of:

1) physical components and events associated with at least one manufacturing plant,
2) physical components and events associated with at least one of the following industries: medical, airline, social media, telecommunications, oil and gas, chemicals, hydrocarbon processing, pharmaceutical, and biotechnology, and
3) physical components and events associated with at least one securities market,
4) events associated with weather, and
5) physical components and events associated with at least one of housing and commercial real estate markets.

3. The method of claim 1, wherein the component data includes at least one value-based data item representative of component ID data.

4. The method of claim 3, wherein a user causes the computer system to perform at least one of the following: data visualization, trend, or predictive analysis.

5. The method of claim 4, further comprising filtering the at least one component dataset based on the time interval.

6. The method of claim 5, wherein the at least one component dataset further comprises event compilations.

7. The method of claim 6, wherein the at least one condition of a respective physical component comprises event data.

8. The method of claim 1, wherein the statistical prediction of future performance comprises a preventive maintenance interval.

9. The method of claim 1, wherein at least one of the statistical prediction of future performance comprises a trigger to buy or sell.

10. A computer system, comprising:
a computer program stored on a non-transitory storage subsystem of the computer system, comprising instructions that, when executed, cause a processor to execute the steps of:
generating at least one ad hoc grouping of component datasets associated with a respective at least one subset of a plurality of physical components according to a respective at least one data taxonomy;
wherein each physical component of the plurality of physical components is associated with at least one value-based data item representative of at least one of:
i) at least one condition of a respective physical component and
ii) at least one event related to the respective physical component;
receiving, via a computer graphical user interface, a user selection, identifying at least:
1) the at least one ad hoc dynamic grouping and
2) a specified time interval;
obtaining component data in the component datasets of the at least one ad hoc dynamic grouping based on the specified time interval;
generating a single dataset file from the component data;
applying at least one statistical trend analysis technique to the single dataset file to determine at least one trend in the component data;
transforming based at least in part on the at least one trend in the component data, the component data into an operational group model to model failure and performance for the at least one subset of the plurality of physical components of the at least one ad hoc dynamic grouping of the single dataset file; and
causing, based at least in part on the operational group model, to generate a statistical prediction of future performance of the at least one subset of the plurality of physical components of the at least one ad hoc dynamic grouping of the single dataset file.

11. The system of claim 10, wherein the plurality of physical components and the at least one event are selected from the group consisting of:
1) physical components and events associated with at least one manufacturing plant,
2) physical components and events associated with at least one of the following industries: medical, airline, social media, telecommunications, oil and gas, chemicals, hydrocarbon processing, pharmaceutical, and biotechnology, and
3) physical components and events associated with at least one securities market,
4) events associated with weather, and
5) physical components and events associated with at least one of housing and commercial real estate markets.

12. The system of claim 10, wherein the component data includes at least one value-based data item is representative of component ID data.

13. The system of claim 10, wherein the statistical prediction of future performance comprises a preventive maintenance interval.

14. The system of claim 10, wherein the statistical prediction of future performance comprises a trigger to buy or sell.

* * * * *